United States Patent
Merkel et al.

(10) Patent No.: US 7,193,879 B2
(45) Date of Patent: Mar. 20, 2007

(54) TECHNIQUES FOR MULTIPLE FREQUENCY CHIRP READOUT OF MATERIAL WITH INHOMOGENEOUSLY BROADENED ABSORPTION SPECTRUM

(75) Inventors: Kristian Merkel, Bozeman, MT (US); William R. Babbitt, Bozeman, MT (US)

(73) Assignee: Montana State University, Bozeman, MT (US)

( * ) Notice: Subject to any disclaimer, the term of this patent is extended or adjusted under 35 U.S.C. 154(b) by 115 days.

(21) Appl. No.: 11/036,491

(22) Filed: Jan. 14, 2005

(65) Prior Publication Data
US 2005/0163460 A1 Jul. 28, 2005

Related U.S. Application Data

(60) Provisional application No. 60/538,422, filed on Jan. 22, 2004.

(51) Int. Cl.
*G11C 13/04* (2006.01)
*G03H 1/10* (2006.01)
*G03H 1/12* (2006.01)
*G02B 6/00* (2006.01)

(52) U.S. Cl. .................. 365/106; 385/147; 359/3; 359/10; 359/11

(58) Field of Classification Search .............. 365/106
See application file for complete search history.

(56) References Cited

U.S. PATENT DOCUMENTS

| | | | |
|---|---|---|---|
| 5,239,548 A * | 8/1993 | Babbitt et al. | 372/26 |
| 6,654,394 B1 | 11/2003 | Sellin et al. | |
| 6,680,860 B1 * | 1/2004 | Merkel et al. | 365/119 |
| 2006/0012797 A1 * | 1/2006 | Chang et al. | 356/484 |
| 2006/0049981 A1 * | 3/2006 | Merkel et al. | 342/195 |
| 2006/0203324 A1 * | 9/2006 | Harris et al. | 359/278 |

OTHER PUBLICATIONS

Kris Merkel, Demonstration of the spatial-spectral coherent holographic integrating processor S2-CHIP for analog RF signal processin, Proceedings of the GOMACTech Conference, Tampa, Florida, Mar. 2003, Publisher: Proceedings of the GOMACTech Conference, Published in: US.

Cole, Z., et al., Choherent integration of 0.5 GHz spectral holograms at 1536 nm using dynamic biphase codes, Applied Physics Letters, vol. 81, No. 19, Nov. 4, 2002.

V. Lavielle, et al., Wideband versatile radio-frequency spectrum analyzer, Optics Letters, Mar. 15, 2003, pp. 384-, vol. 28, No. 6, Publisher: Optical Society of America, Published in: US.

* cited by examiner

*Primary Examiner*—Michelle Connelly-Cushwa
(74) *Attorney, Agent, or Firm*—Evans & Molinelli PLLC; Eugene Molinelli

(57) ABSTRACT

Techniques for reading the spectral content of a spatial-spectral grating in an inhomogeneously broadened transition (IBT) material include directing multiple probe waveforms to probe a spatial mode of the IBT material. Each probe waveform is a linear frequency modulated chirp; each probe waveform partially overlaps in frequency with a different probe waveform; and multiple output signals are detected from the IBT material in response. Based on the multiple output signals, a readout signal is determined that represents a complete or nearly complete temporal map of the spectral content of the spatial-spectral grating. Calibration of the frequency content can be achieved by simultaneously reading out calibration spectral features. These techniques allow high-bandwidth spectral content to be read with segmented narrow bandwidth chirp probe waveforms and low-bandwidth high-dynamic-range detectors and digitizers.

38 Claims, 13 Drawing Sheets

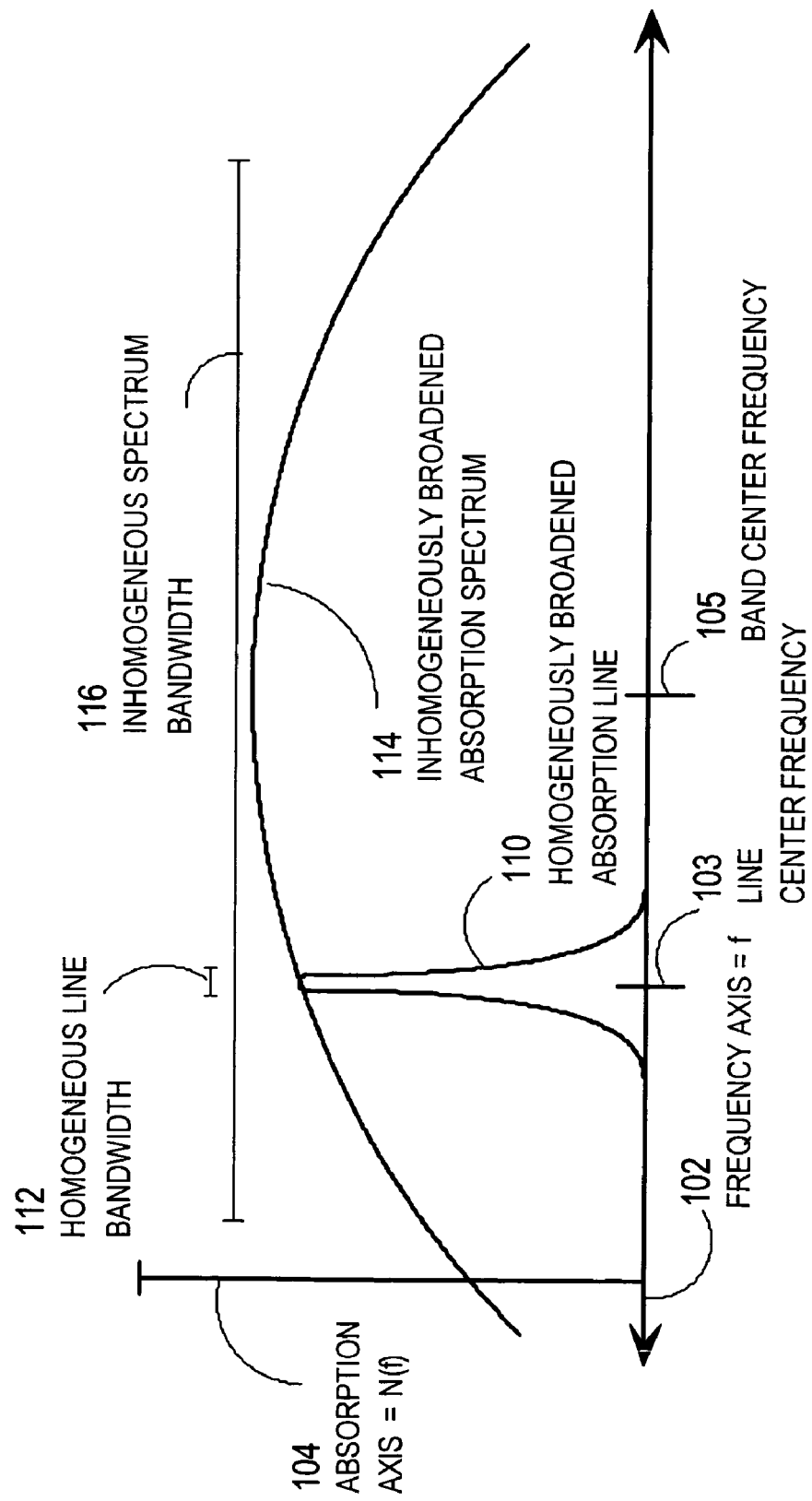

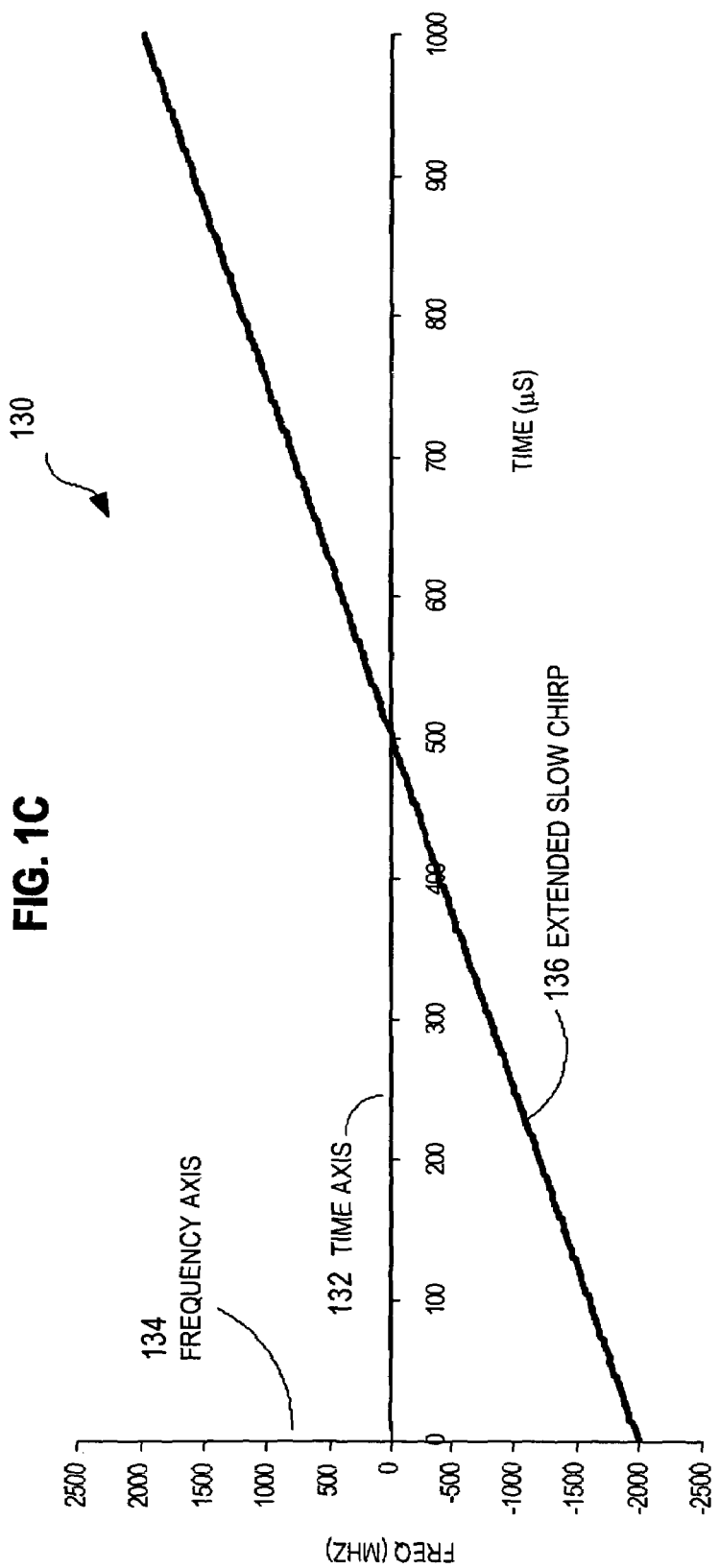

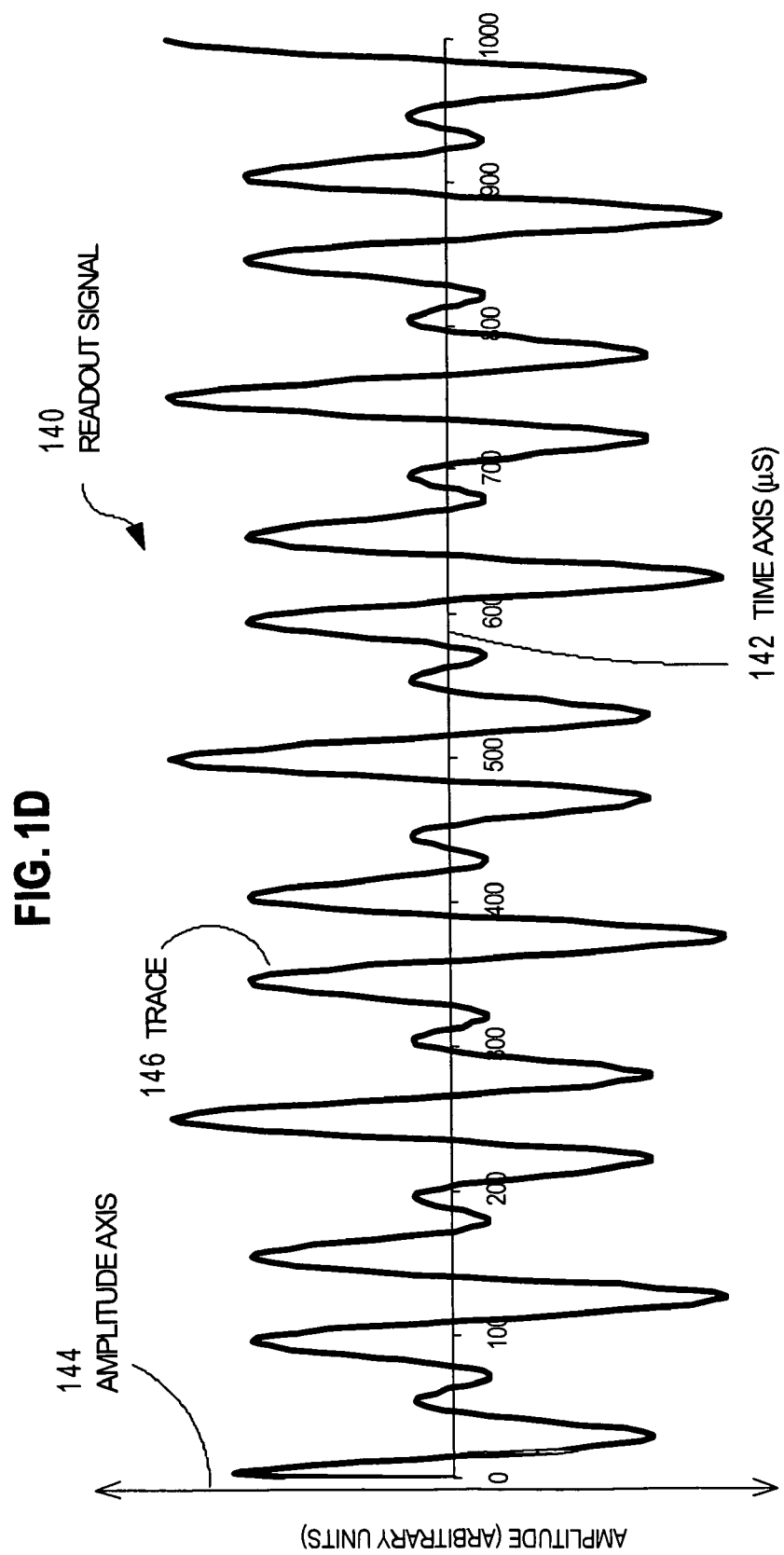

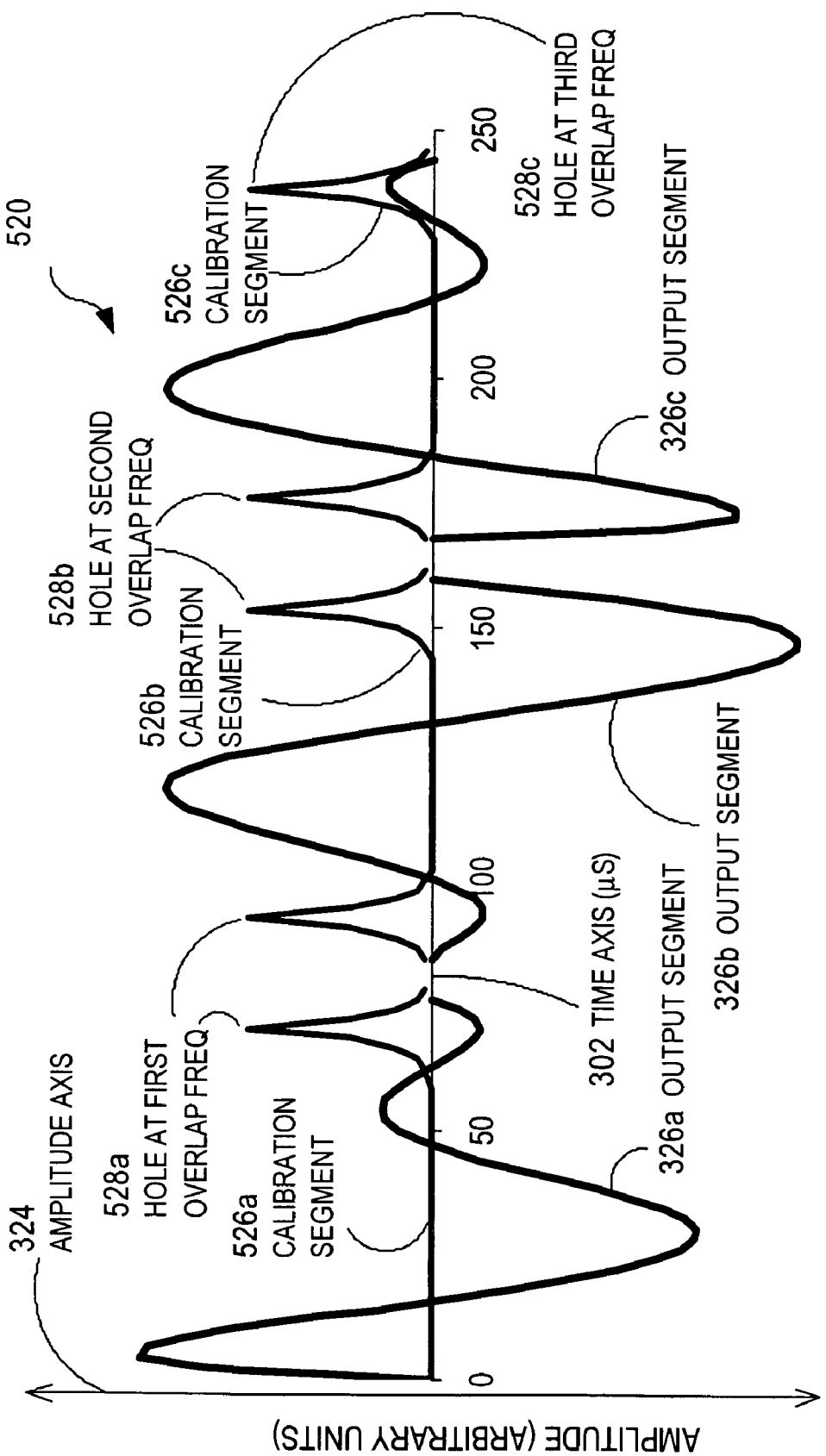

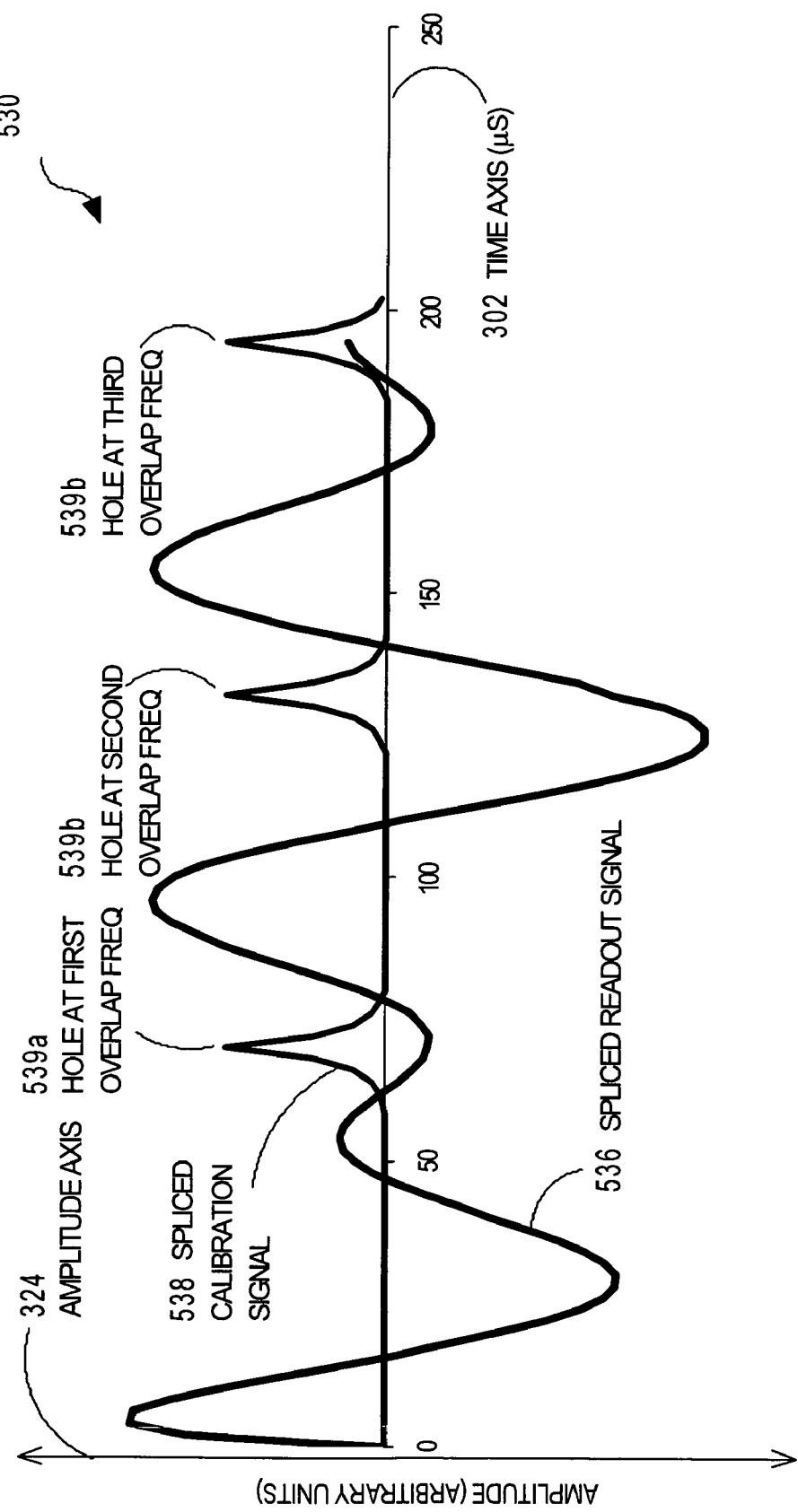

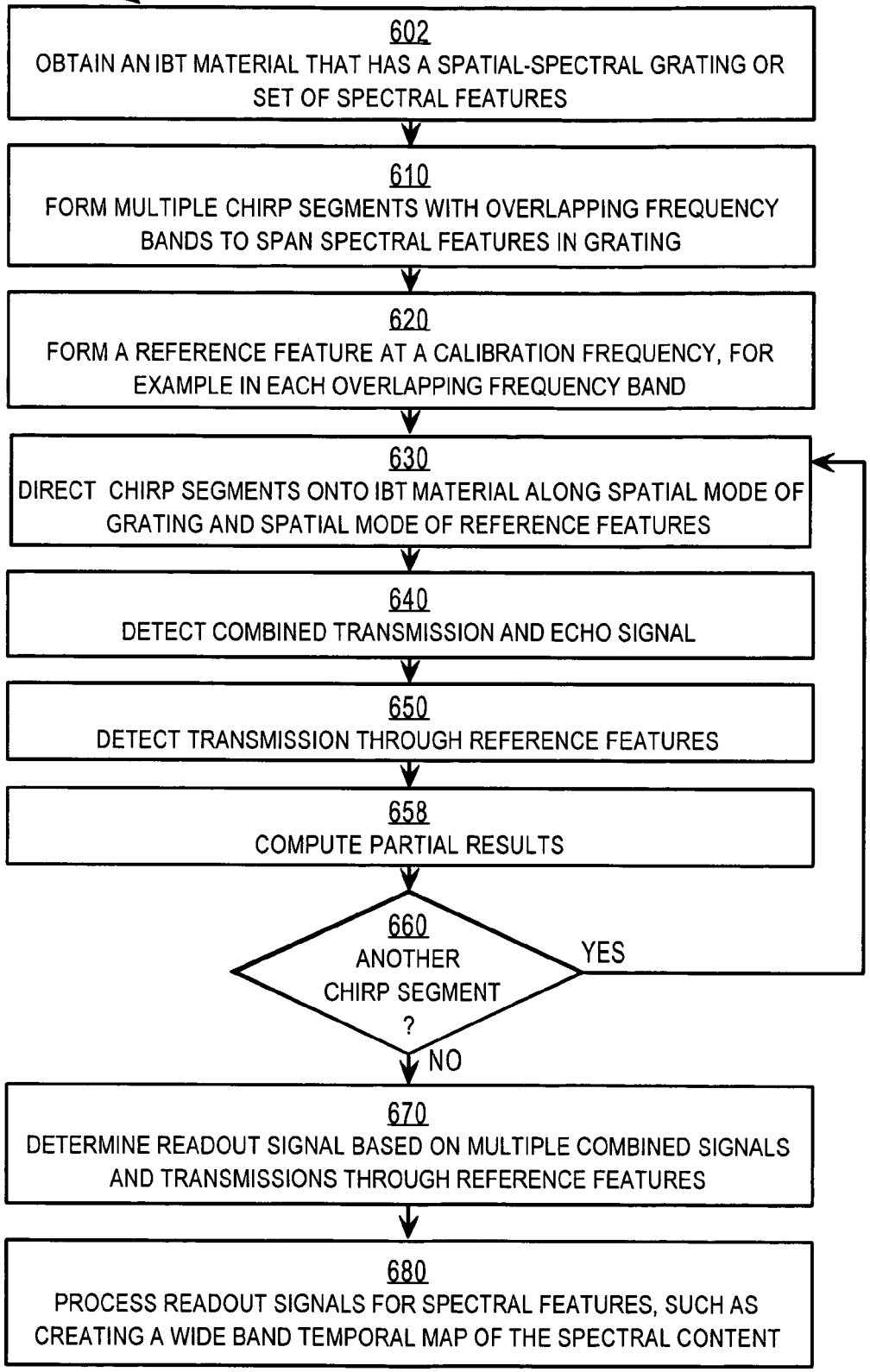

TECHNIQUES FOR MULTIPLE FREQUENCY CHIRP READOUT OF MATERIAL WITH INHOMOGENEOUSLY BROADENED ABSORPTION SPECTRUM

CROSS-REFERENCE TO RELATED APPLICATIONS

This application claims benefit of Provisional Appln. 60/538,422, filed Jan. 22, 2004, the entire contents of which are hereby incorporated by reference as if fully set forth herein, under 35 U.S.C. §119(e).

BACKGROUND OF THE INVENTION

1. Field of the Invention

The present invention relates to an inhomogeneously broadened transition (IBT) material, also called a spatial-spectral (S2) material, to achieve optical analog signal processing, and in particular to using multiple frequency chirp segments to read out an absorption spectrum stored in the material.

2. Description of the Related Art

The absorption features of ions or molecules doped into inorganic or organic materials are spectrally broadened by two main classes of mechanisms. Homogeneous broadening is the fundamental broadening experienced by all ions or molecules independently, and arises from the quantum-mechanical relationship between the frequency line shape and the dephasing time of the excited electron in the ion or molecule. Inhomogeneous broadening refers to the quasi-continuum of overlapping individual spectra of all of the ions or molecules in the material, which have microscopically different environments and therefore slightly different transition frequencies. When the inhomogeneous broadening of a material is significantly larger than the homogeneous broadening of a material, the material displays useful optical absorption properties and is called an IBT material. Doping of certain rare earth ions in inorganic materials in a certain way produces IBT materials that are useful in broadband signal processing applications. In various materials known in the art, the absorption demonstrates optical frequency selectivity over bandwidths typically far greater than 1 gigaHertz (GHz, 1 GHz=$10^9$ Hz, Hertz=cycles per second) and with frequency resolution typically far less than 1 megaHertz (MHz, 1 MHz=$10^6$ Hz).

The frequency selectivity can be modified locally by interaction with optical signals that excite electrons in the ions, which serve as absorbers, from a ground state to an excited state, thereby removing those electrons from the population of ground state absorbers at that location in the material. This creates a reduction in the absorption at the resonant frequency of these ions. Therefore, some such materials have been used to form highly frequency selective spatial-spectral gratings, and these materials are sometimes called spatial-spectral materials (S2 materials). After some time, the electrons may return to the ground state and the grating decays with a characteristic time called the population decay time. When electrons are removed from the ground state in a particular homogeneously broadened absorption peak, a "hole" is said to be "burned" in the absorption of the material at the frequency of the hole, and light at the frequency of the hole is transmitted with substantially less absorption. A spectral hole is an example of the most simple burned spectral feature, and combinations of spectral holes at different frequencies with varying depths are here denoted as spectral features or spectral gratings. The lifetime of the spectral features is determined by the time it takes for the absorbers in the system to return to their equilibrium state. Spectral features may be made permanent in some systems.

Some IBT materials have been used as versatile optical coherent transient (OCT) processing devices. An OCT device relies on a broadband spatial-spectral grating in the optical range that extends over several homogeneous lines, and part or all of the available inhomogeneous broadening absorption profile. All the features of an optical spatial-spectral grating are typically formed substantively simultaneously by recording the spatial spectral interference of two or more optical pulses separated in time only (purely spectral grating) or separated in both space and time (a spatial-spectral grating). A spatial-spectral grating has the ability to generate a broadband optical output signal that depends on an optical input probe wave form impinging on that grating and the programming pulses that formed the grating.

In some OCT devices, the approach to accessing the information in the spatial-spectral grating is to probe that grating with a high bandwidth, Fourier-transform-limited optical signal, such as a coherent brief optical pulse, or a series of such coherent brief optical pulses. Under certain conditions the probing of the grating can produce optical output signals that are generally referred to as stimulated photon echoes or optical coherent transients. A single brief coherent light pulse with a bandwidth equal to that of the spectral grating stimulates a time-delayed output signal whose temporal profile represents the Fourier transform of the spectrum recorded in the grating structure.

While useful in many applications, the approach of readout with a high bandwidth, Fourier-transform-limited coherent brief optical pulse or series of optical pulses at the full bandwidth of processing can suffer, at present, from the limited performance in dynamic range of photo-detectors and analog to digital converters (ADCs) that are needed to make a measurement of any instantaneous high bandwidth optical signal. Existing high bandwidth detectors and ADCs (also called "digitizers" herein) have limited performance and higher cost as compared to lower bandwidth detectors and digitizers. For example, currently available photodetectors with a bandwidth response of greater than 10 GHz (e.g., 1554 12-GHz photodetector, available from New Focus of San Jose, Calif.) has less than 30 dB of dynamic range. Much higher dynamic ranges of photodetectors are preferred for accurate measurement applications, which can be found in photodetectors with much lower (e.g. 1000 times lower) bandwidth responses. For example, photo-detectors with bandwidths on the order of 10 MHz can provide on the order of 90 dB of dynamic range (e.g., S2386 Silicon Photodetector, available from Hamamatsu Photonics, K.K., headquartered in Hamamatsu City, Japan, with offices worldwide).

Likewise, digitizers with sample rates over 1 giga-sample per second (Gs/s) are limited in performance and expensive. It is industry standard for a digitizer to produce 2.5 samples per resolved oscillation, so for example, a detector with an 8 GHz bandwidth would be followed by a digitizer with ~20 Gs/s capability. Digitizer performance is specified in terms of N bits, where the analog signal can be quantized to one of ~$2^N$ levels. A survey performed in 1999 of digitizer performance at that time found that the signal-to-noise ratio (SNR) bits, denoted as 'SNR-bits' of digitizers, expressed as effective number of bits according to SNR-bits=(SNR(dB)−1.72)/6.02, fell off with a slope of (−1) bit per octave of the sample rate (see R. H. Walden, "Analog-to-Digital Converter Survey and Analysis", IEEE Journal on selected Areas in Communications, VOL. 17, NO. 4,1999). For example, a 100 M/s digitizer may have 11 SNR-bits, while a 12800 Ms/s (12.8 Gs/s) digitizer would have 4 SNR-bits. Even in 2004, after the invention described herein, the highest reported performance in SNR-bits at high sample rates was 3 to 4 SNR-bits at 20 to 40 Gs/s (see W. Cheng et. al, "40 GSPS ADC-DAC Components for the ADAM Receiver-Exciter ASIC" and F Stroili, et. al, "Multifunction Receiver-on-Chip Technology for Electronic Warfare Applications", both articles found in the Proceedings of the GomacTech conference, Monterey, Calif., 2004). Present day oscilloscope technology offers effective digitizer performance with a bandwidth limit of 6 GHz (achieved with several ADC boards that together give an effective advertised sample rate of 20 Gs/s) and an effective resolution that is currently limited to about 3.5 bits at 6 GHz (e.g., TDS6604 real time oscilloscope, available from Tektronix of Beaverton, Oreg., USA). Much higher digitizer performance is preferred. In 2004, digitizers with operation sample rates on the order of 100 Mega-samples per second (Ms/s) can have up to 16 bits of resolution for a modest cost (e.g., AD10678, 16 bit digitizer at 80 Ms/s, available from Analog Devices of Norwood, Mass. for about $500). By means of cost comparison, a 10 GHz photodetector is about 100 times more expensive than a 10 MHz photodetector, and a 20 Gs/s oscilloscope (comprised of several digitizers and supporting electronics) is about 100 times more expensive than a ~100 Ms/s digitizer (with supporting electronics).

Optical linear frequency modulation (LFM) signals, i.e., frequency "chirped" signals (also called "chirps"), have been used as waveforms in pulse sequences to write spatial-spectral gratings for applications of storage, signal processing, true time delay generation, and arbitrary waveform generation, and also for readout of spectral gratings. In the case of readout chirps used to generate coherent transient output signals, the chirps are typically limited in duration to less than the decoherence time of the transition These chirped probes generate a temporal output signal that represents a collective readout of all the absorbers, as with the brief pulse excitation, but under the condition of swept excitation.

In a recent approach, a temporally extended chirp is used as a probe waveform to generate a readout signal that represents a temporal map of the structure of the spectral population grating, rather than its Fourier transform as with a brief pulse. This readout signal can be measured with inexpensive, high dynamic-range, MHz bandwidth photodetectors and digitizers. Such extended chirps generally have a duration greater than the decoherence time and less than the population decay time of the inhomogeneously broadened absorption spectrum in the IBT material. This approach is described in patent application PCT/US03/14612 entitled "Techniques For Processing High Time-Bandwidth Signals Using A Material With Inhomogeneously Broadened Absorption Spectrum", filed May 12, 2003 by inventors Kristian Doyle Merkel, Zachary Cole, Krishna Mohan Rupavatharam, William Randall Babbitt, Kelvin H. Wagner, and Tiejun Chang (hereinafter "Merkel") and published by the World Intellectual Property Organization as WO 03/098384 A2 on 27 Nov. 2003, the entire contents of which are hereby incorporated by reference as if fully set forth herein. This approach is subsequently described in U.S. patent application Ser. No. 10/515089, filed Nov. 12, 2004.

As described in Merkel, an extended chirp sweeping over the entire IBT frequency band of interest, e.g., in excess of 1 GHz, can produce a readout signal with a low-bandwidth (a few to tens of MHz) intensity modulation that can be detected and digitized with the low-bandwidth high-dynamic-range devices that are currently available. This low-bandwidth readout signal represents a temporal map of the frequency spectral features in the spatial-spectral grating. For example, in some cases the readout signal can include temporal spikes that each represents a spectral hole burned in the IBT material. In other cases the readout signal includes a superposition of low-bandwidth beat frequencies, each beat related to a periodic component in the frequency spectrum of the grating. Multiple combinations and mixtures of these two example cases can be employed in some embodiments.

However, current known techniques for producing optical chirps that have the desired levels of linearity and stability in frequency are limited to using radio frequency pulses with bandwidths of about 1 GHz to drive optical modulators that modulate a frequency stable laser. Therefore, techniques are needed to generate a stable, linear frequency chirped pulse with greater than about 1 GHz bandwidth. Additionally, or in the alternative, techniques are needed to generate a low-bandwidth readout signal that represents a temporal map of the entire frequency band of interest in the IBT material, e.g., much greater than 1 GHz, using the currently available frequency chirped pulses of about 1 GHz.

Based on the foregoing, there is a clear need for techniques to generate a readout signal that represents an accurate, precise and substantively complete temporal map of the structure of the entire frequency band of interest in the IBT material, and which does not suffer the disadvantages of prior art approaches.

In particular, there is a clear need for generating a readout signal that represents an accurate, precise and substantively complete temporal map of about one GHz of bandwidth or more of the spectral content in IBT materials, which can be measured with inexpensive, high-dynamic-range, low-bandwidth detectors and digitizers.

Furthermore, there is a clear need for generating a readout signal that represents an accurate, precise and substantively complete temporal map of the entire spectral content of interest in IBT materials using several linear, stable chirps that each has a bandwidth smaller than the bandwidth of the spectral content of interest.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

Techniques are provided for reading spectral content of a spatial-spectral grating or spatial spectral features in an IBT material. These techniques allow high-bandwidth spectral content to be read with relatively narrow bandwidth segmented chirp probe waveforms and low-bandwidth high-dynamic-range detectors and digitizers that are less expensive, more sensitive and more readily available than high-bandwidth devices.

According to one set of embodiments of the invention, a method for reading spectral content of a spatial-spectral grating in an IBT material includes directing multiple probe waveforms to probe a spatial mode of the IBT material. Each probe waveform is a linear frequency modulated chirp; and each probe waveform partially overlaps in frequency with a different probe waveform. Multiple output signals are detected from the IBT material in response to the multiple probe waveforms. Based on the multiple output signals, a readout signal is determined that represents a temporal map of the spectral content of the spatial-spectral grating.

According to an embodiment of this aspect, the method also includes directing the probe waveforms onto a calibration spatial mode of the IBT material where one or more calibration reference features have been burned at corresponding calibration frequencies. Multiple calibration signals are detected from the IBT material in response to directing the probe waveforms onto the second spatial mode. The step of determining the readout signal is further based on the multiple calibration signals.

In other sets of embodiments of the invention, an optical system, and a computer readable medium implement steps of the above method.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a graph that illustrates a homogeneously broadened absorption spectral line and an inhomogeneously broadened absorption spectrum in an IBT material;

FIG. 1C is a graph that illustrates an example probe waveform for a readout process;

FIG. 1D is a graph that illustrates an example readout signal based on the spectral content of FIG. 1B and the probe waveform of FIG. 1C;

FIG. 5B is a graph that illustrates multiple output and calibration segments from the IBT material when probed using the multiple chirp segments as the probe signal, according to an embodiment;

FIG. 5C is a graph that illustrates a portion of a readout signal constructed by splicing together output segments in FIG. 5B at times indicated by peaks in calibration signals, according to an embodiment;

FIG. 6 is a flow diagram that illustrates a method for reading spectral content of a spatial-spectral grating in an IBT material, according to an embodiment.

DETAILED DESCRIPTION

Figure 1B:
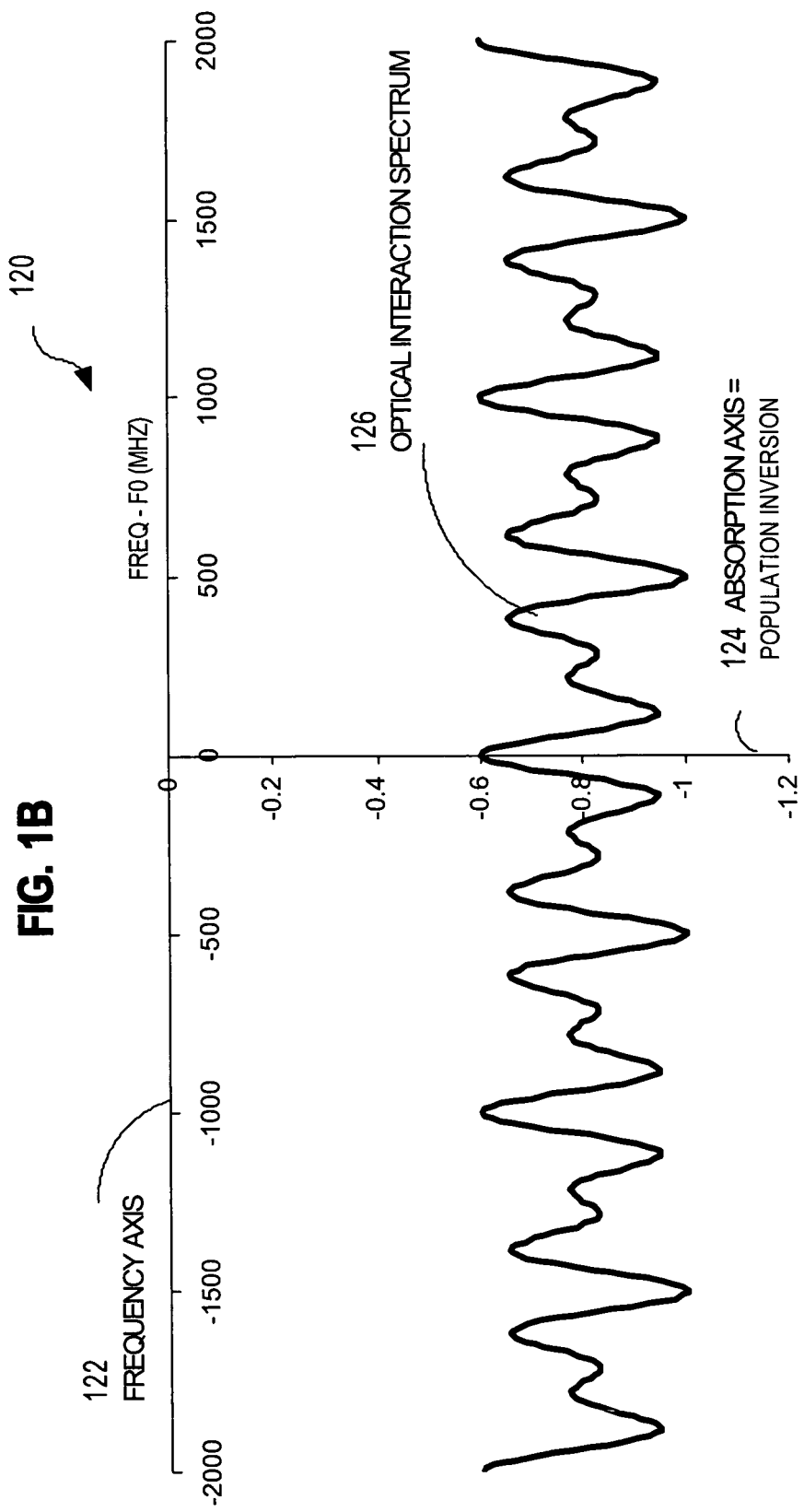
FIG. 1B is a graph that illustrates spectral content of an example spatial spectral grating in an IBT material, according to an embodiment.

A method and apparatus are described for segmented chirp readout of spatial-spectral gratings in IBT materials. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the present invention are described according to the following outline.

1.0 Functional Overview
2.0 Single Chirp Readout
3.0 Structural Overview
4.0 Multiple Chirp Readout
   4.1 Overlapping Multiple Chirp Readout
   4.2. Calibrated Multiple Chirp Readout
5.0 Method of Reading Spectral Content
6.0 Processor Hardware Overview 1.0 Functional Overview IBT materials, as described above, are capable of storing spatial-spectral gratings with spectral features having bandwidths in excess of 1 GHz. Such gratings can represent meaningful information, such as the results of high-bandwidth analog optical processing, as described in Merkel.

Readout of spectral features in spatial-spectral gratings can be achieved, as also described in Merkel, by using an optical frequency chirped pulse that sweeps over the IBT frequency band of interest, e.g., in excess of 1 GHz, to produce a readout signal with a low-bandwidth optical intensity modulation that can be detected and digitized with the low-bandwidth high-dynamic-range devices that are currently available. Sensitive high-dynamic-range photodetectors, with bandwidths of about 10–40 MHz and dynamic range of about 90 dB, and digitizers, with sample rates of about 25–100 Ms/s and 16-bit dynamic range (also about 90 dB), are currently available and cost effective.

Highly linear, phase continuous, frequency stable, wideband optical frequency chirps with the appropriate chirp rate are desired as the probe waveform for the readout process.

In one approach, a wideband optical chirp can be created by using an external cavity laser diode that is swept in frequency by tuning the cavity or an intra cavity element. However, the resulting chirps have not yet proven to be sufficiently linear due to significant unpredictable frequency and phase jitter along its chirp duration.

Of the currently known techniques for producing optical frequency chirps with an appropriate level of linearity and stability in frequency, these are limited to techniques involving modulation of a frequency stable optical carrier with a chirped radio frequency pulse.

Such linear, phase continuous, frequency stable frequency radio frequency chirps pulses can be created currently with analog techniques, or with direct digital synthesis (DDS) techniques of analog waveforms using computer based algorithms and digital-to-analog converters. Stable, linear, phase continuous radio frequency (RF) chirps with the chirp rates on the order of MHz/$\mu$s can be created over bandwidths about 1 GHz. For example, with currently available state of the art DDS hardware with a relatively high clock rate and high-dynamic-range digital to analog converters (e.g., AD9858, 10 bit DDS at 1000 Ms/s, available from Analog Devices of Norwood, Mass.), a linear, repeatable, stable and phase continuous RF chirped pulse can be created with a bandwidth covering less than about 500 MHz (e.g., 0 to 400 MHz). Using faster sample rate digital to analog converters with less vertical resolution, larger bandwidth RF chirps can be created, For example, a 12 Gs/s DAC with 1 bit of vertical resolution can create a single octave RF chirp from 2.4 to 4.8 GHz (2.4 GHz bandwidth).

Optical chirped pulses can be created using this RF signal that is then modulated onto a stable optical signal using techniques involving the interaction of light with the electrical signal. Typical devices known in the art include acousto-optic modulators and electro-optic modulators. For example, the RF chirps can be used to drive an acousto-optic modulator that is single sideband (SSB) with a 200 to 375 MHz RF chirped signal, where the acousto-optic modulator is optically double passed and double modulated (taking out the angular dependence of the beam with modulation) to create an appropriate narrowband optical chirp from 400 MHz to 750 MHz frequency modulation on top of an optical carrier at frequency f0. This results in a 350 MHz bandwidth optical LFM pulse around an optical frequency f0 that can be used to read out a narrowband (e.g. 350 MHz) portion of the spectral grating. Alternatively, for example, the RF chirp can drive an electro-optical phase modulator that would create multiple optical chirps around the carrier, such as a positive first order chirp from +200 to +375 MHz and a negative first order chirp from −200 to −375 MHz, and higher order terms (+400 MHz to +750 MHz and −400 MHz to −750 MHz, etc. due to the phase modulation of the carrier). Other kinds of more complex electro-optical modulation schemes are also possible, such as single sideband electro-optical modulation.

According to embodiments of the invention, a low-bandwidth readout signal is generated by probing the spatial-spectral grating in an IBT material with multiple linear, stable chirps at varying optical carrier frequencies. The readout signal is produced by processing multiple output signals received from the IBT material after probing by the multiple chirped optical pulses.

For purposes of illustration, the following description is provided in the context of a spatial-spectral grating with spectral features that include two periodic components in frequency representing the interference of a transmitted signal with a reflected signal having two delayed near-replicas of the transmitted signal, as may occur in applications, such as RADAR, described in Merkel. However, embodiments of the invention are not limited to this context. Embodiments of the invention may be practiced in any application where the bandwidth of the spectral features of interest in a spatial-spectral grating exceeds the bandwidth of chirp probes that yield temporal outputs that can be measured by detectors or digitizers sensitive enough to be used for the application. Thus, in such embodiments, the spectral features are arbitrary, and are not limited to spectral features that are created by the interference of delayed signals.

FIG. 1A is a graph that illustrates a homogeneously broadened absorption spectral line 110 and an inhomogeneously broadened absorption spectrum 114 in an IBT material. The frequency axis 102 represents frequencies (f), in Hz, increasing to the right. The absorption axis 104 represents the population (N(f)) of absorbers, which are available to absorb light at a particular frequency, and is related to the absorption of light per unit length along a spatial path into the material. The graph depicts a homogeneously broadened absorption spectral line 110 centered online center frequency 103, which has a homogeneous line bandwidth proportional to the reciprocal of a time called the homogeneous dephasing time or the de-coherence time of the transition. The dephasing time is the time scale over which phase-sensitive transitions between the ground state and the excited state of a homogeneous set of absorbing ions or molecules remains coherent.

The inhomogeneous broadening is typically caused by defects found in the crystalline host of the absorbing molecule or ion. These local defects, the "inhomogeneities," cause similar ions to have different resonant frequencies, but do not broaden the individual homogeneous resonances. The inhomogeneously broadened absorption spectrum 114 has a band center frequency 105 and an inhomogeneous spectrum bandwidth 116, represented by the symbol $B_M$ for the material bandwidth. The band center frequency is in the optical band, which encompasses frequencies from 100 to 1000 TeraHz (THz, 1 THz=$10^{12}$ Hz). However, the inhomogeneous spectrum bandwidth 116, $B_M$, is typically less than a THz—large compared to the bandwidths available for processing using other techniques, but small compared to the hundreds of THz bandwidth of the optical band.

When an electron makes the transition to the excited state because of light of a particular frequency impinging at a particular location in the material, there is one fewer ground state ion at that frequency and location. Therefore, the population of ground state absorbers decreases and the absorption decreases at that frequency and location. Members of a population of excited electrons gradually return to the ground state, and the population of absorbers, along with the absorption, returns to its initial value. The time scale associated with this process is the population decay time, which is typically much longer than decoherence or dephasing time.

For purposes of illustration, it is assumed that the bandwidth of interest of the spatial-spectral grating in the IBT material is 4 GHz around a center optical frequency f0 (i.e., the band of interest spans f0−2 GHz to f0+2 GHz). It is further assumed that there are two periodic components of interest, representing the interaction in the IBT material of a first optical signal with a second signal having two delayed near-replicas of the first optical signal. The first delay, τ1, is 0.003 microsecond (μs, 1 μS=$10^{-6}$ seconds); and the second delay, τ2, is 0.005 μs. These delays are selected for simplicity of illustration only, and both shorter and much longer delays are anticipated in typical embodiments. These delays appear in the spatial-spectral grating as oscillations of absorption in the absorption spectrum with a periodicity equal to 333.3 MHz and 200 MHz, respectively, given by the reciprocals of the respective delays. This relationship is given by Equation 1

$$P = 1/\tau \qquad (1)$$

wherein P is the period (in units of frequency) of a spectral component in a spatial-spectral grating which corresponds to a particular delay τ. This period P is noteworthy in that it is a period in frequency rather than a period in time—it is a property of the Fourier transform that two spikes delayed in time, such as a reference spike and a reflected spike delayed by τ, corresponds to a period in frequency, P.

FIG. 1B is a graph 120 that illustrates the spectral content of this example spatial-spectral grating. The frequency axis 122 represents frequency deviation from a central processing frequency f0, in MHz, increasing to the right. The absorption axis 124 represents the population inversion where −1 represents the original population of absorbers, all ions in their ground state (the opposite of complete inversion), 0 represents equal numbers of ions in the ground and excited states (no absorption), and +1 represents a state in which all absorbers are in their excited state (complete inversion), so that gain is present. This definition causes a spectral hole in absorption to appear as a spike in a plot of population inversion. The example two periodic components in frequency caused by the interaction of the signal with its two delayed replicas of equal strength form an optical interaction spectrum. The example optical interaction spectrum 126, depicted in FIG. 1B, includes a sum of an oscillating absorption with a period P1 of 333 MHz and an oscillating absorption with a period P2 of 200 MHz corresponding to the two delays τ1, τ2, respectively. In the illustrated example, the two components are sinusoidal functions of equal amplitude that sum to zero at −2000 MHz.

2.0 Single Chirp Readout

Highly linear, phase continuous, frequency stable, wideband frequency chirps with an appropriate chirp rate would be a desired probe waveform for the readout process. The chirp rate (κ) is given by the chirp bandwidth ($B_R$) divided by the temporal extent ("duration") of the chirp ($T_R$), as shown in Equation 2.

$$\kappa = B_R / T_R \quad (2)$$

It is assumed for purposes of illustration that a useful duration is about a millisecond (ms, 1 ms=$10^{-3}$ seconds), on the order of the population decay time for some IBT materials and the coherent integration time for some RADAR applications; therefore it is assumed in this illustration that $T_R$=1000 μs. In the illustrated example, the bandwidth of interest is 4 GHz (4000 MHz); therefore $B_R$=4000 MHz. Consequently, a useful chirp rate in the illustrated embodiment is about κ=4 MHz/μs.

FIG. 1C is a graph 130 that illustrates an example desired probe waveform for the readout process. The horizontal time axis 132 represents time during the probe waveform, increasing to the right from 0 to 1000 μs. The vertical frequency axis 134 represents frequency deviation from the central processing frequency f0, in MHz, increasing upwards. This probe waveform is composed of an extended frequency chirp, as suggested in Merkel. The example probe waveform is an extended chirp 136 that has duration of one millisecond, that has a chirp rate (κ=4 MHz/μs), and that, consequently, spans the entire 4000 MHz bandwidth of interest in the illustrated embodiment.

In general, the probe waveform produces multiple high-bandwidth output signals from the spatial-spectral grating in the IBT material, a transmission and zero or more echoes. The transmission includes high-bandwidth information from the absorption spectrum in the spatial-spectral grating. Each echo is a reduced amplitude replica of the probe waveform delayed by a time equal to the delay in the signals that interacted to form the spatial-spectral grating in the RADAR application.

To generate a low-bandwidth readout signal that can be detected with sensitive high-precision detectors and digitizers, the high-bandwidth output signals are combined with a reference chirped optical waveform to produce low-bandwidth beat signals, each with a beat frequency $F_B$ that is proportional to the delay r and the chirp rate K, as shown in Equation 3a.

$$F_B = \kappa^* \tau \quad (3a)$$

As is well known in the art, beat frequencies are related to the difference in frequency of two simultaneous signals at a detector. With delayed chirped signals, as used here, the frequency difference is steady and equal to the chirp rate κ times the delay τ. Each beat frequency commences after the start of the output signal by the delay time corresponding to the beat. In terms of the period P (in units of frequency) of the oscillations in the absorption spectrum, this relationship is expressed in Equation 3b.

$$F_B = \kappa / P \quad (3b)$$

If the interacting waveforms that form the spatial-spectral grating include several delayed near-replicas, the low-bandwidth readout signal includes a linear superposition of the beat frequencies associated with all the delays. Table 1 gives values for the delays τ, periods P, and beat frequencies $F_B$ for the illustrated example of a spatial-spectral grating, and for several values of the chirp rate κ. The delays τ1 and τ2 in the illustrated example occupy the first two rows of Table 1, with longer delays included for reference. As can be seen in Table 1, all the beat frequencies, $F_B$, are low bandwidth signals that are easily measured by high-dynamic-range detectors and digitizers operating in the megaHertz range. A readout signal with such beat frequency components provides a low-bandwidth temporal map of the spectral features of interest in the interaction absorption spectrum.

TABLE 1

Values of spectral features for example spatial-spectral grating.

| τ (μs) | P (MHz) | $F_B$ (MHz) for γ = 2 MHz/μs | $F_B$ (MHz) for γ = 4 MHz/μs | $F_B$ (MHz) for γ = 8 MHz/μs |
|---|---|---|---|---|
| 0.003 | 333.3 | 0.006 | 0.012 | 0.024 |
| 0.005 | 200 | 0.010 | 0.020 | 0.040 |
| 0.05 | 20 | 0.1 | 0.2 | 0.4 |
| 0.5 | 2 | 1 | 2 | 4 |
| 5 | 0.2 | 10 | 20 | 40 |

FIG. 1D is a graph 140 that illustrates an example time trace 146 of a readout signal based on the spectral content of FIG. 1B and the probe waveform of FIG. 1C. The horizontal time axis 142 represents time after a signal is received at the detector, increasing to the right from 0 to 1000 μs. The vertical amplitude axis 144 represents amplitude of the readout signal in arbitrary units. The illustrated readout signal represented by trace 146 includes two low-bandwidth beats, one at 0.012 MHz and another at 0.020 MHz corresponding to the two delays τ1, τ2 listed in Table 1 for a chirp rate of 4 MHz/μs. These appear as temporal oscillations with temporal periods of about 83 μs and 50 μs, respectively. The two temporal oscillations are delayed by 0.003 μs and 0.005 μs, respectively; such delays are too small to see in FIG. 1D, or to measure with MHz range detectors and digitizers. Thus the delays 0.003 μs and 0.005 μs are determined based on the chirp rate κ, the easily measured beat frequencies $F_B$ at 0.012 MHz and 0.020 MHz in the low-bandwidth temporal oscillations, and Equation 3a.

3.0 Structural Overview

Figure 2:
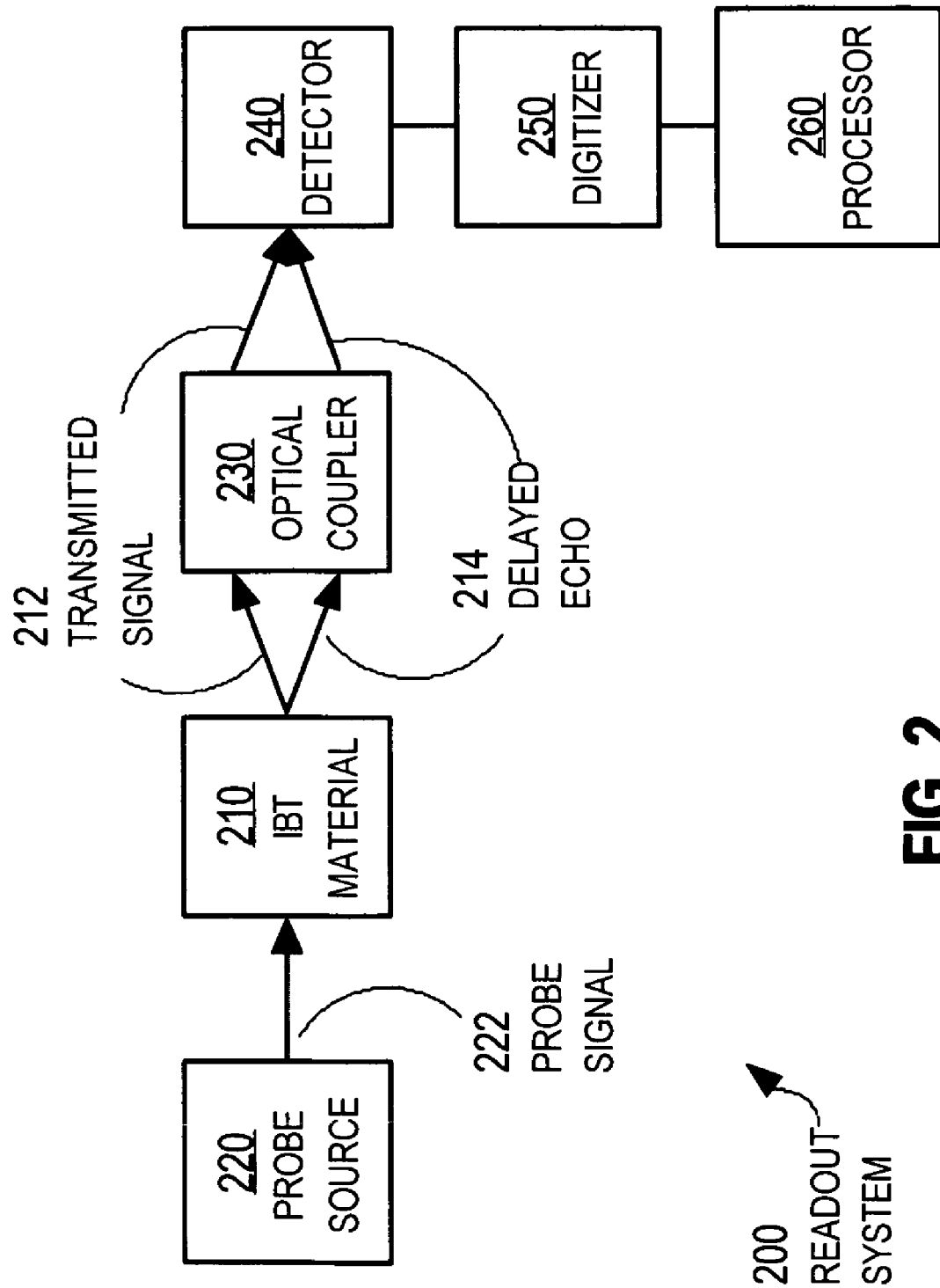
FIG. 2 is a block diagram that illustrates a system for performing the readout process, according to various embodiments.

FIG. 2 is a block diagram that illustrates a system 200 for the readout process, according to various embodiments. The system 200 includes the IBT material 210 with the spatial-spectral grating, a probe source 220, an output optical coupler 230, a low-bandwidth detector 240, a low-bandwidth digitizer 250, and a processor 260.

Previous to readout, the IBT material 210 is pre-programmed to contain spectral features to be determined by the readout process. In some embodiments, the features are spectral only. In some embodiments, the features include a spatial-spectral grating that is formed by the interaction of multiple programming waveforms incident on the IBT material along different spatial modes. As used herein, a spatial mode of an optical beam in the IBT material is a position and direction of propagation of the optical beam in the IBT material. A spatial mode in the IBT material is designated by its vector wavenumber, represented by the symbol k. In some embodiments, the spatial-spectral grating is formed by the interaction of multiple programming waveforms along different spatial modes. In the current illustrated example, the spatial-spectral grating includes, at a particular spatial location, the optical interaction spectrum 126 depicted in FIG. 1B formed by two programming signals arriving along the same spatial mode, such that the vector wavenumber of the first programming signal, k1, and the vector wavenumber of the second programming signal, k2, are equal.

The probe source 220 generates an optical probe signal 222 to determine the spectral content of the spatial-spectral grating in the IBT material 210. In the current illustrated example, the probe signal 222 is the extended chirp 136 depicted in FIG. 1C. Any method known in the art at the time the system 200 is assembled may be used to generate the optical probe signal 222. The optical probe signal 222 is on a beam that is directed by an optical coupler into the IBT material along a probe spatial mode designated by its vector wavenumber $k_P$. The optical coupler (not shown) is any combination of components known in the art that are used to direct an optical beam, such as free space, vacuum, lenses, mirrors, beam splitters, and optical fibers.

The output optical coupler 230 directs the transmission output signal 212 and the delayed echo 214 for further processing. The output echoes can be coherently combined with a reference signal to form a low bandwidth beat signal at the detector. The transmission output or a separate reference chirp (not shown) can be used as this reference signal. Any method known in the art at the time the system 200 is assembled may be used to couple the output echo signals with the reference signal so that they are combined and are spatially coherent to form a low-bandwidth beat signal at the detector. In the illustrated embodiment, among others, the transmission and one or more echoes are directed by optical coupler 230 so that they are combined at the detector 240 to form a detectable signal with one or more low-bandwidth beat frequencies.

In some embodiments, the transmission and echo are emitted from the IBT material 210 in different spatial modes, as displayed in FIG. 2. This occurs, for example, when the programming optical signals had interacted in the IBT material 210 along different spatial modes, e.g., when k1 is different from k2. In embodiments with more than two processing signals that interact among more than two different spatial modes, echoes in more than one spatial mode may appear. In some such embodiments, the probe signal is aligned with either k1 or k2 or some other probe spatial mode designated by vector wavenumber kp. The transmission and echo are emitted in directions predicted by phase matching the wavenumbers k1, k2, kp.

In some embodiments, the transmission and echo are emitted from the IBT material 210 in the same spatial mode. This occurs, for example, when the programming optical signals interacted in the IBT material 210 along the same spatial mode, e.g., when there is only a single direction of programming, with k2=k1. In such cases the transmission and delayed echo are collinear and inherently combined coherently on the detector to produce a low-bandwidth beat signal. In some embodiments, such as when a spectral hole is burned in the IBT material, there may be no distinct echo.

In some such embodiments a coherent transient response occurs that distorts the shape of the readout spectral hole. Nonetheless, the characteristics of the spectral hole can be determined based on the distorted shape. In embodiments with no distinct echo or with echo and transmission signal inherently combined (e.g. spectral only gratings), the optical coupler 230 simply directs a single optical beam output from the IBT material onto the detector 240; in some such embodiments the optical coupler 230 may simply be composed entirely of free space.

In some embodiments, an optical coupler combines the delayed echo 214 with a reference signal, such as an attenuated replica of the probe signal, instead of the transmitted signal 212 at detector 240. This is referred to as heterodyne detection.

Detector 240 measures the intensity of an optical beam impinging on the detector. Any method known in the art and capable of measuring the temporal features of interest may be used as the detector 240. For example, some detectors generate a voltage proportional to the intensity of light impinging on the detector within the entire optical frequency band (several THz). In the illustrated embodiment, a high-dynamic range, low-bandwidth (~10 MHz) detector is used as detector 240 to produce a low-bandwidth temporal trace of voltage, such as trace 146, that is proportional to the intensity of the optical low-bandwidth beat signal.

Digitizer 250 transforms an analog signal from detector 240 into digits that can be processed by a digital processor. In some embodiments, detector 240 and digitizer 250 are combined in a digital light sensor. In some embodiments, subsequent processing is done with an analog processor; and digitizer 250 may be omitted. In the illustrated embodiment, a high-dynamic-range low-bandwidth digitizer is used as digitizer 250.

Processor 260 uses the measured trace, proportional to intensity, to determine the spectral features of the spatial-spectral grating. In the illustrated embodiment, processor 260 determines the two beat frequencies $F_B$ (0.012 MHz and 0.020 MHz) from trace 146, such as by performing a Fourier transform of the trace, and derives the two delays (0.003 μs and 0.005 μs, respectively) based on those $F_B$ and the chirp rate of the probe signal, κ=4 MHz/μs. In various embodiments, the processor 260 is a digital processor, an analog processor, or some combination of digital and analog processors. Digital components of a processor are often programmable by software, and an overview of hardware for a programmable processor is provided in a later section. In embodiments with a programmable processor, the processor 260 includes software executed by the hardware.

4.0 Multiple Chirp Readout

As previously stated, stable, linear, phase continuous radio frequency (RF) chirps with the chirp rates on the order of MHz/μs can be created over relatively narrow bandwidths of about 1 GHz According to the illustrated embodiments, multiple relatively narrowband optical chirps, called "optical chirp segments," are used as the probe signal.

In various embodiments, different approaches are pursued for creating more than one optical chirp segment on one or more optical carriers, to extend the bandwidth of a single segment by a factor as great as the number of segments. Any approach known in the art at the time an embodiment of the invention is implemented may be used. According to one general approach, a set of optical tones, each distinct in time, are created in a stair-step fashion. For example, an optical ring containing a frequency shifter, delay line and optical amplifier is injected with a single frequency optical pulse and used to create a timed sequence of frequency tones (frequency shifted each ring pass). (See for example H. Takesue, F. Yamamoto, and T. Horiguchi, "Stable Lightwave Frequency Synthesis Over 1-THz Span Using Fabry-Perot Cavity Containing PolarizationRotation Elements and Actively Controlled Tunable Bandpass Filter" IEEE PHOTONICS TECHNOLOGY LETTERS, VOL. 12, NO. 1, JANUARY (2000) and references therein). These time stepped tones output from the optical ring with a frequency shifter can be used as the input beam to an acousto-optic modulator (AOM) or electro-optical modulator (EOM) and modulated with a relatively narrowband radio frequency chirp to make a sequence of optical chirp segments on each frequency shifted time segment to cover a wide bandwidth spectral region. This approach is included in the subject matter of a separate patent application by Harris and Merkel.

In another embodiment, a time-stepped series of RF tones (created, for example, by a DDS, or by a bank of stable RF oscillators and time-switching techniques, or other techniques) is applied to an wideband electro-optical modulator. The resulting comb of optical tones is selectively filtered to produce a single (or multiple) optical tone per time slot, such as by frequency selective optical amplification via injection locking. (See Z. Cole and R. Krishna Mohan, "Optical frequency chirp generation by swept sideband injection locking, Journal of Luminescence 107, 146–149, 2004). These time stepped tones outputs can be used as the input beam to an acousto-optic modulator (AOM) or electro-optical modulator and modulated with a relatively narrowband radio frequency chirp to make a sequence of optical chirp segments on each frequency shifted time segment to cover a wide bandwidth spectral region. In other embodiments, other approaches for multiplexing segmented chirps temporally, spectrally, spatially, or angularly are used.

When using an optical chirp segment for readout, the delay that is inherently imposed on the echo signal by the, physical process of echo creates a time period equal to that delay when the echo and reference signal do not beat. This time creates a region of the temporal map of the frequency features that is not effectively probed by the optical chirp segment. When using chirp segments that are separated in time and non-overlapping in frequency, this process alone creates gaps in the temporal map of the spectral features.

While perhaps useful for some embodiments in the state described above, in some embodiments it is difficult to align the phase of the frequency components at the edges of the narrowband chirps on the optical carrier when bringing the temporal edges of adjacent pulses together. Further, in some embodiments, uncertainties in the starting frequency and phase of sequential chirp segments creates a discontinuity in the phase between the narrowband optical chirp segments. If one were to attempt to create a wideband chirp by stitching together the temporal edges of two adjacent chirp segments by bringing them together in time and adjusting the chirp bandwidth so that the frequencies of at the end of one chirp segment and the beginning of the next chirp segment match up, there could be an unknown phase discontinuity that creates edge effects. If this discontinuity proves to be problematic, then trying to use the sequential chirp segments as one broader band chirp for coherent readout of a spectral grating would not be sufficient for wideband readout, since the discontinuity causes a similar discontinuous phase effect in output segments used to form the readout signal. If the chirp segments brought together as one chirp are used directly for readout, this phase discontinuity creates an artificially large noise floor in the power spectral density of the temporal sequence. These edge effects thus hinder the determination of spectral features of interest in the spatial-spectral grating for some embodiments.

4.1 Overlapping Multiple Chirp Readout

According to some embodiments of the invention, a low-bandwidth readout signal is generated by probing the spatial-spectral grating in an IBT material with multiple linear, stable relatively narrowband chirp segments. The readout signal is produced based on processing multiple output segments received from the IBT material after probing by the multiple chirp segments. To guarantee complete frequency coverage with a phase continuous readout and to reduce edge effects, the multiple chirp segments are chosen so that each chirp segment overlaps another chirp segment in frequency.

For example, each narrowband RF chirp modulates an optical carrier to form an optical chirp segment. Subsequent optical chirp segments are formed by frequency shifting the optical carrier by an amount less than the bandwidth of the narrowband chirp segment and then modulating the frequency-shifted optical carrier with the narrowband RF chirp. For purposes of illustration, it is assumed that the resulting optical chirp segments are a sequence of 300 MHz narrowband chirps that are frequency shifted by multiples of 250 MHz. Each of the multiple optical chirp segments so produced overlaps by 50 MHz one or two adjacent optical chirp segments.

Although near-identical chirp segments are produced in this example embodiment, in other embodiments other methods are used to produce multiple overlapping chirp segments that are not similar in duration, chirp rate, bandwidth or width of frequency overlap.

Figure 3A:
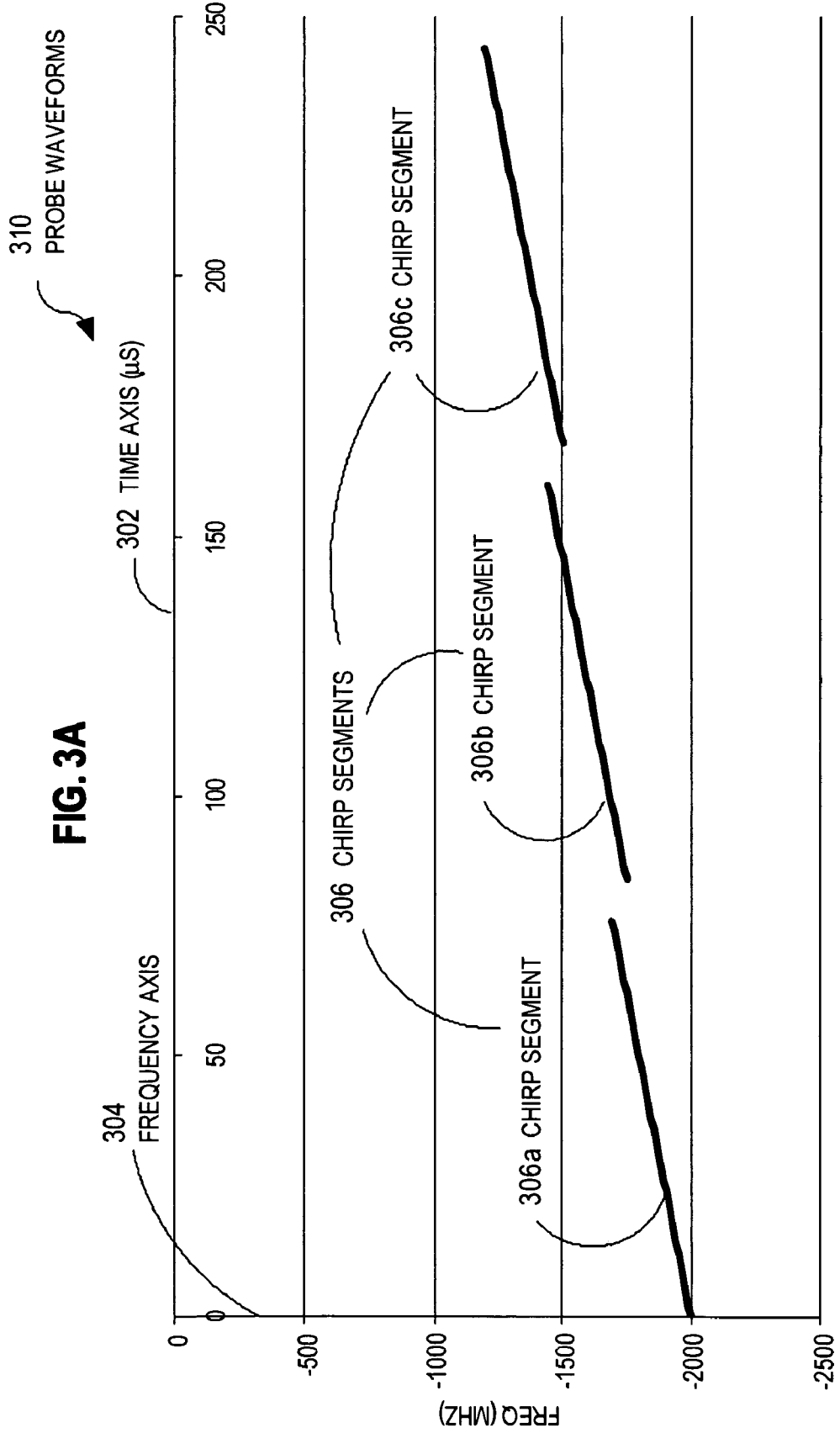
FIG. 3A is a graph that illustrates multiple overlapping chirp segments of a probe signal, according to an embodiment.

FIG. 3A is a graph that illustrates multiple overlapping chirp segments of a probe signal, according to an embodiment. The horizontal axis 302 is time from beginning of the probe signal in μs. The vertical axis 304 is frequency difference from a center frequency f0. Each chirp segment is considered a probe waveform. Multiple chirp segments (probe waveforms) make up the probe signal transmitted from the probe source 220 to the IBT material 210. To avoid cluttering the diagram, the entire example probe signal is not displayed; only the first three chirp segments 306a, 306b, 306c are displayed of sixteen chirp segments 306 that span the frequency range of interest from f0 −2000 MHz to f0 +2000 MHz. In the illustrated embodiment, each chirp segment 306 is about 300 MHz wide and overlaps by about 50 MHz one or two adjacent chirp segments. For example, chirp segment 306a extends from f0 −2000 MHz to about f0 −1700 MHz and overlaps by about 50 MHz the chirp segment 306b that extends from about f0 −1750 MHz to about f0 −1450 MHz. Chirp segment 306b not only overlaps chirp segment 306a by about 50 MHz, but also overlaps by about 50 MHz chirp segment 306c that extends from about f0 −1500 MHz to about f0 −1200 MHz.

Any method known in the art at the time this readout technique is implemented may be used for generating multiple chirp segments. In some embodiments, the optical chirp segments are generated by repeatedly shifting a 300 MHz optical chirp by 250 MHz in an optical ring like that described above. This latter approach is included in the subject matter of the separate patent application by Harris and Merkel mentioned above.

In the illustrated embodiment, each chirp segment 306 is separated in time from an adjacent chirp segment 306 by about 8 μs. In other embodiments, the chirp segments are not separated in time or are separated by more or less than 8 μs. In the preferred embodiments, no chirp segments 306 overlap in time, so that outputs from different chirp segments remain distinct in time. In the illustrated embodiments, the about 50 MHz overlap in frequency and 8 μs gap between chirp segments stretches out the duration of the probe signal. The about 50 MHz overlap band at 4 MHz/μs leads to 12.5 μs extra time per chirp segment to form the probe signal. This plus the 8 μs gap between chirp segments leads to 20.5 μs extra time per segment (compared to a continuous chirp) for a total additional duration of 307.5 μs for the 4000 MHz readout. Thus, the probe signal in total has a duration of about 1300 μs to span 4000 MHz, as compared to the 1000 μs duration probe signal depicted in FIG. 1C.

In the illustrated embodiment, each chirp segment of the probe signal (222 in FIG. 2) induces a separate transmission signal 212 and zero or more echoes 214 that are combined by optical coupler 230 into a combined signal called an output segment at detector 240.

Figure 3B:
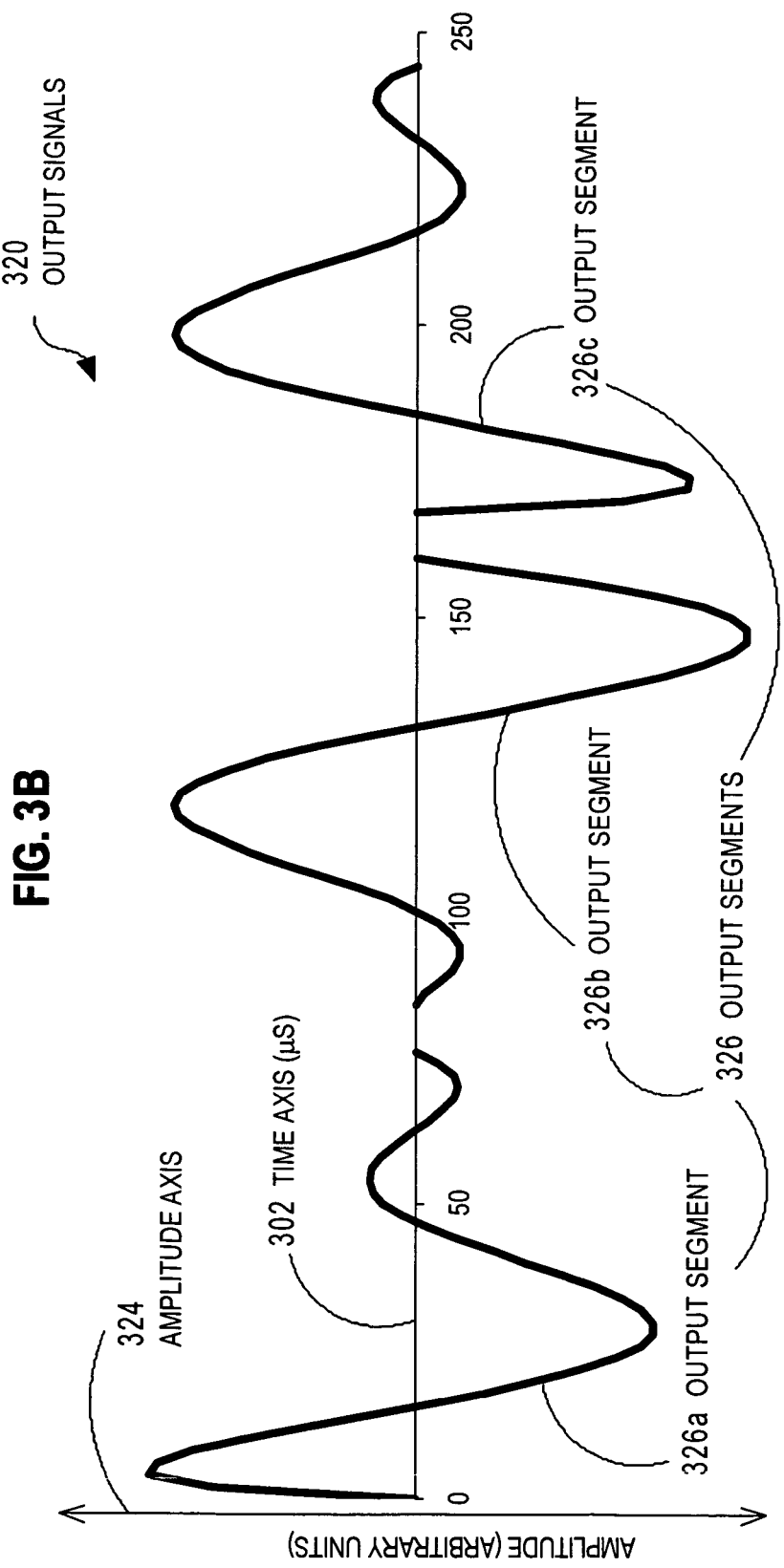
FIG. 3B is a graph that illustrates multiple combined output signals formed at a detector based on outputs from the spatial spectral grating in the IBT material of FIG. 1B when probed using the multiple chirp segments of FIG. 3A as the probe signal, according to an embodiment.

FIG. 3B is a graph 320 that illustrates multiple output segments formed at a detector based on outputs from the spatial-spectral grating in the IBT material when probed using the multiple chirp segments as the probe signal, according to an embodiment. The horizontal axis 302 is time (in μs) from the beginning of the first detected combined signal. The vertical axis 304 is amplitude in arbitrary units. Multiple output segments make up the combined signals measured at detector 240 in FIG. 2. To avoid cluttering the diagram, all the output segments resulting from the entire example probe signal are not displayed; only the first three output segments 326a, 326b, 326c are displayed of sixteen output segments 326.

In some embodiments, more than one of the probe chirp segments can be used at the same time, i.e., the temporal durations of two or more chirp segments in the IBT material overlap in time. To distinguish the output segments from the separate chirp segments that overlap in time, the overlapping chirp segments are directed onto the IBT material on different probing spatial modes. The resulting output segments are then found on different output spatial modes. The vector wavenumber of each output spatial mode is determined by matching the vector wavenumber of the probing spatial mode with the vector wavenumber of the signals that produced the spatial-spectral grating to be read, such as vector wavenumbers k1 and k2.

For both overlapping and non-overlapping durations of probe chirp segments, timing and edge effects influence the start and end of each output segment 326. For purposes of illustration, it is assumed that the edge effects cause a few μs at the start of each output segment to have amplitudes that approach zero. This is consistent with a notion that there is no beating signal until a time on the order of the shortest delay in the illustrated embodiment.

According to embodiments of the invention, a readout signal is produced based on multiple output segments generated from the multiple chirp segments. For example, readout trace 146 is generated based on output segments 326.

According to the illustrated embodiment, the output segments can be spliced together to form the readout signal 140 and trace 146 in FIG. 1D. The splicing may be performed in hardware or software in the detector (240 in FIG. 2) or digitizer 250 or processor 260, or some combination of these devices. Any method known in the art may be used to splice the output segments together. During the splicing process, portions of the output segments affected by edge effects are removed, e.g., in the illustrated example, the first few μs and last few μs of each output segment are removed.

The elapsed time from the start of each output segment is associated with a frequency in the corresponding chirp segment. The associated frequency is given by the start frequency of the corresponding chirp segment plus the product of the elapsed time of the chirp segment times the chirp rate κ, as given in Equation 4a.

$$fi(ti)=fi_0+\kappa *ti \quad (4a)$$

where ti is the elapsed time in output segment i, $fi_0$ is the start frequency of the ith chirp and fi is the frequency associated with the time ti. For the illustrated example in which each chirp segment is incremented by 250 MHz, $fi_0$ (in MHz) is given by Equation 4b, resulting in the relationship given in Equation 4c.

$$fi_0=250*(i-1)-2000 \quad (4b)$$

$$fi(ti)=250*(i-1)-2000+\kappa *ti \quad (4c)$$

In the illustrated embodiment, the splicing process includes keeping only one amplitude associated with a given frequency even though two amplitudes are available for frequencies in the overlapping frequency bands, one from each of two output segments. In some embodiments, the one amplitude kept for a frequency in the overlap band is the one that occurs farther from the edge of its output segment; this approach automatically eliminates the amplitudes most affected by edge effects. In another embodiment, a mathematical combination of the two amplitudes is used.

The uncertainty in the timing and starting frequencies and the edge effects often make it difficult to determine when each output segment begins, and therefore makes it difficult to rely on Equation 4a to determine the matching frequencies associated with different elapsed times in different output segments. This uncertainty can impede the splicing process and the accuracy of the reconstructed readout signal. In some embodiments of the invention, the spectral features of the readout signals in the overlap areas can be used to reduce this uncertainty. This can be done by matching the spectral features in the overlap areas of adjacent readout segments.

4.2. Calibrated Multiple Chirp Readout

Figure 4:
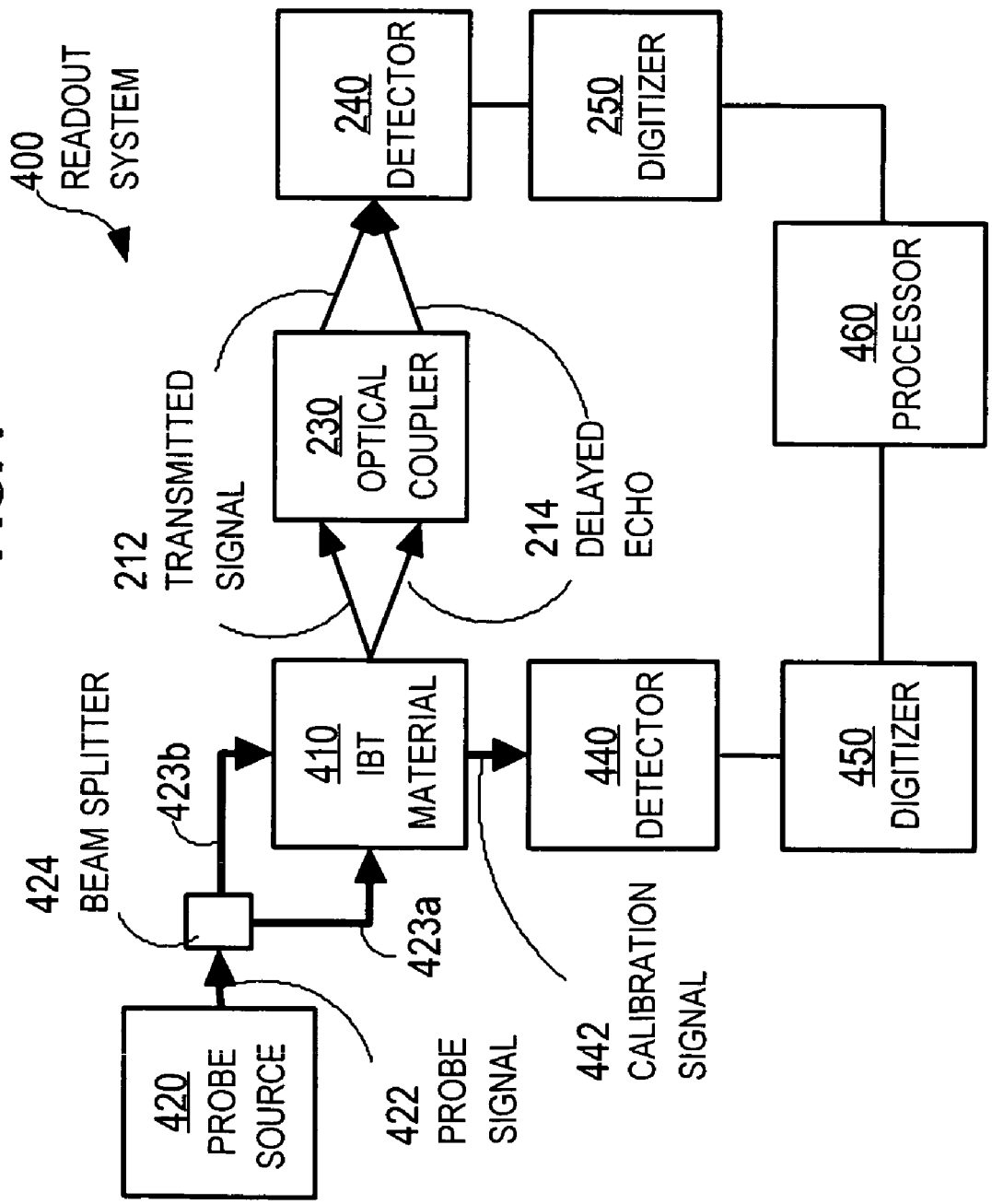
FIG. 4 is a block diagram that illustrates a system for performing the readout process with calibrated frequencies in overlapping frequency bands of multiple chirp segments, according to an embodiment.

In some embodiments of the invention, the frequencies in the overlap areas are calibrated using additional spectral features that are burned in the IBT material. FIG. 4 is a block diagram that illustrates a system 400 for performing the readout process with calibrated frequencies in overlapping frequency bands of multiple chirp segments, according to an embodiment. The system 400 includes the IBT material 410 with the spatial-spectral grating and spectral features for calibration, a probe source 420, a beam splitter 424 in an input optical coupler (not shown), the output optical coupler 230, two low-bandwidth detectors 240, 440, two low-bandwidth digitizers 250, 450, and a processor 460.

The IBT material 410 is programmed to contain a spatial-spectral grating with spectral features to be determined by the readout process, as described above with reference to FIG. 2. In addition, the IBT material 410 is programmed with one or more calibration spectral features to calibrate frequencies in the overlapping frequency bands.

The required amount of frequency overlap and the calibration spectral features will depend on the delays that are read out, the timing and frequency jitter in the readout chirp, and the desired frequency bandwidth of the calibration signal.

Figure 5A:
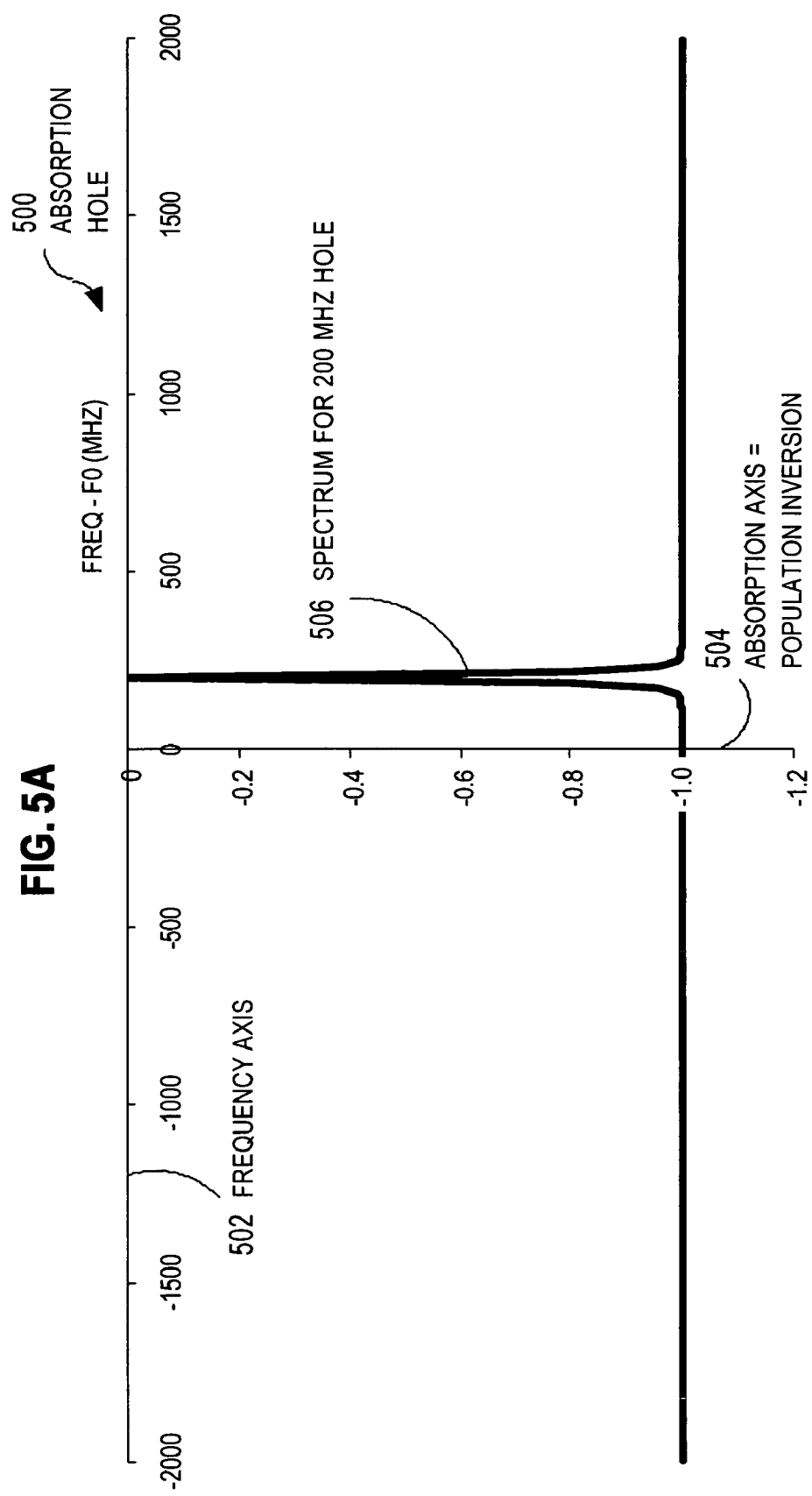
FIG. 5A is a graph that illustrates the spectral content of an example spectral hole.

FIG. 5A is a graph 500 that illustrates the use of a spectral feature as a calibration feature, with the specific example of a spectral hole burned at 200 MHz. The frequency axis 502 represents frequency deviation from a central processing frequency f0, in MHz, increasing to the right. The absorption axis 504 represents the population inversion, defined above. The example absorption spectrum 506 for a 200 MHz hole is plotted on graph 500. The hole shows a population inversion of zero indicating relative minimum absorption at 200 MHz from f0 and a population inversion of −1, indicating essentially maximum absorption, at most other frequencies. The frequency width of the spectral hole is indicated by values greater than −1 and is a result of the homogeneous line bandwidth (112 in FIG. 1A) and the stability and duration of the laser that burns the hole. The width of this singular spectral feature is chosen to illustrate spectral structure within the frequency region of overlap of 50 MHz that can be used for calibration. A spectrum like 506 can be formed in a spatial mode of the IBT material by a light beam from a frequency stabilized laser at the center optical frequency, e.g., f0+200 MHz, as is well known in the art. For example, burning spectral holes in IBT materials is described in Moerner, W. E. (ed.). 1988. Persistent Spectral Hole-Burning: Science and Applications. Berlin: Springer-Verlag, the entire contents of which are hereby incorporated by reference as if fully set forth herein.

In some embodiments, more complex calibration spectral features than holes are burned by any technique known in the art. For example, in some embodiments, the calibration spectral feature is a periodic spectral grating that extends over the full bandwidth of interest. Combinations of different spectral features and structures are employed in various embodiments to increase the accuracy of the calibration and to remove any ambiguities in the calibration process.

For calibration purposes, the spectral features or structure that are used for calibration in the calibration spatial mode can include spectral features that are inside the spectral region of overlap, as well as spectral features that are outside the region of overlap.

In some embodiments, the calibration spectral feature is formed by directing a broadband waveform and a delayed version of the broadband waveform, with a well known delay, onto the calibration spatial mode. The delayed version may be at the same amplitude or at a different amplitude. The calibration spectral features are formed by the interference of these two broadband waveforms. In some embodiments, the broadband waveform can be modulated in intensity, phase or frequency, or some combination, including a broadband optical chirp.

For embodiments in which calibration features are spectral holes in each region of overlap, one approach for creating these multiple holes at multiple calibration frequencies is to use a beam from a stable optical source that is sent through the same or another separate ring, as described above, to create a series of frequency tones at the appropriate frequencies and with appropriate temporal duration intervals. In another approach, a stable optical source at center resonance is modulated with an electro-optic modulator with RF square wave phase modulation at the desired frequency separation (e.g. 250 MHz) to create optical sidebands. Because of the persistence of the optical transition, the spectral calibration features can be written at varying times within the population lifetime, or simultaneously. In another embodiment, a broadband waveform is caused to interfere with a delayed replica, where the delay is well calibrated, to form a calibration spectral structure that extends over the full bandwidth of interest.

In the current illustrated example, the IBT material 410 includes multiple spectral features along a spatial mode different from the spatial modes used to form the spatial-spectral grating to be read. One spectral hole is burned in each of the 15 overlapping frequency bands of the 16 chirp segments. Table 2 lists the 16 frequency bands of the chirp segments (given as deviations from optical frequency f0) and the calibration frequency holes burned in the IBT material in the illustrated embodiment.

TABLE 2

List of example chirp segments and calibration hole frequency deviations.

| Chirp segment start frequency (MHz) | Chirp segment end frequency (MHz) | Calibration feature center frequency (MHz) |
| --- | --- | --- |
| −2000 | −1700 | −1725 |
| −1750 | −1450 | −1475 |
| −1500 | −1200 | −1225 |
| −1250 | −950 | −975 |
| −1000 | −700 | −725 |
| −750 | −450 | −475 |
| −500 | −200 | −225 |
| −250 | 50 | 25 |
| 0 | 300 | 275 |
| 250 | 550 | 525 |
| 500 | 800 | 775 |
| 750 | 1050 | 1025 |
| 1000 | 1300 | 1275 |
| 1250 | 1550 | 1525 |
| 1500 | 1800 | 1775 |
| 1750 | 2050 | None |

The probe source 420 generates a beam with optical probe signal 422 to determine the spectral content of the spatial-spectral grating in the IBT material 410. In the current illustrated example, the probe signal 422 is the multiple chirp segments 306, three of which are depicted in FIG. 3A. Any method known in the art at the time the system 400 is assembled may be used to generate the optical probe signal 422.

The beam splitter 424 splits the beam with the optical probe signal 422 into two beams 423a, 423b with replicas of the optical probe signal 422. The beams 423a, 423b propagate through IBT material 410 along two spatial modes. In the illustrated embodiment, beam 423a passes into the IBT material 410 along the probe spatial mode $k_P$, described above, to elicit the transmission signal 212 and any delayed echoes 214. Beam 423b passes in to the IBT material 410 along a spatial mode $k_C$ where the calibration features were burned. In embodiments in which the calibration holes are burned in the same spatial mode as the probe spatial mode kp, the beam splitter 424 may be omitted. In another embodiment, the calibration is provided by a spatial-spectral grating, read out by diffraction. In another embodiment, heterodyne detection is used to detect the calibration signal.

The optical coupler 230, detector 240 and digitizer 250 are as described above. In the illustrated embodiment with multiple chirp segments as the probe signal, the output of digitizer 250 includes the output segments 326, three of which are depicted in FIG. 3B. In embodiments in which the calibration features are burned in the same spatial mode as the probe spatial mode, the output of digitizer 250 includes the results of the transmission of the readout signal after interacting with those features, as described in more detail below.

Detector 440 is an optical detector positioned to receive a calibration signal emitted from the IBT material 410 as a result of the probe signal 422 on beam 423b. Any method known in the art and capable of measuring the spectral features of interest may be used as the detector 440. In the illustrated embodiment, a high-dynamic range, low-bandwidth detector, like detector 240, is used as detector 440 to produce a low-bandwidth temporal trace of voltage, which is proportional to the intensity of the calibration signal.

Because spectral holes as calibration signals are not created by the delayed coherent interaction of two signals, echoes are typically not produced and in this case, the calibration signal 442 is a simple temporal sweep of the holes burned in the IBT material 410. At high chirp rates, the readout of the holes may produce an optical coherent transient signal that distorts the shape of the spectral hole in the calibration signal, but this distortion is predictable and does not limit the use of spectral holes as calibration features.

In some embodiments, the calibration signals are made to have a predictable shape, well-defined periodicity, or a high signal to noise ratio (SNR), or are highly over-sampled, or have some combination of these characteristics, to accurately determine an arrival time associated with each calibration feature.

FIG. 5B is a graph 520 that illustrates multiple output and calibration signals from the IBT material when probed using the multiple chirp segments as the probe signal, according to an embodiment. The horizontal axis 302 is time (in µs) from the beginning of the first detected output segment. The vertical axis 304 is amplitude in arbitrary units. Calibration segments 526a, 526b, 526c (of 16 calibration segments collectively referenced hereinafter as calibration segments 526) are measured at detector 440. Each calibration segment 526 is generated by one chirp segment (306 in FIG. 3A) of the probe signal. The output segments 326, described above with reference to FIG. 3B, are measured at detector 240 and plotted in FIG. 5B for comparison.

As each chirp segment sweeps through a 300 MHz band of frequency along the spatial mode 423b with holes, at least one hole is encountered, causing the transmission to increase substantially at a time associated with the frequency of the hole. For example, when chirp segment 306a (−2000 MHz to −1700 MHz) is directed along beam 423b into the IBT material, it encounters a spectral hole of −1725 MHz, as indicated by the peak 528a in calibration segment 526a at a time of about 70 µs. When chirp segment 306b (−1750 MHz to −1450 MHz) is directed along beam 423b into the IBT material, it encounters the same spectral hole of −1725 MHz, as indicated by the peak 528a in calibration segment 526b at about 90 µs. Chirp segment 306b also encounters a second spectral hole of −1475 MHz, as indicated by the peak 528b in calibration segment 526b at about 155 µs. Similarly, chirp segment 306c encounters holes of −1475 MHz and −1225 MHz, respectively, as indicated by peaks 528b and 528c in calibration segment 526c at about 180 µs and 240 µs, respectively.

Digitizer 450 transforms an analog signal from detector 440 into digits that can be processed by a digital processor. In some embodiments, detector 440 and digitizer 450 are combined in a digital sensor. In some embodiments, subsequent processing is done with an analog processor; and digitizer 450 may be omitted. In the illustrated embodiment, a high-dynamic-range low-bandwidth digitizer, like digitizer 250, is used as digitizer 450.

Processor 460 is a processor that processes the information received from detectors 240, 440. In various embodiments, the processor 460 is a digital processor, an analog processor, or some combination of digital and analog processors. In embodiments with a programmable processor, the processor 460 includes software executed by the hardware.

In the illustrated embodiment, processor 460 receives the output segments 326 from digitizer 250 and the calibration segments 526 from digitizer 450. The output and calibration signals are synchronized so that processor 460 receives the data aligned in time as depicted in FIG. 5B. Processor 460 generates a readout signal like 140 based on the calibration segments from detector 440 and output segments from detector 240. In the illustrated embodiment, processor 460 splices the output segments 326 together to form readout signal 140 by removing the output segment amplitudes that occur in time between calibration peaks for the same calibration frequency in subsequent calibration segments. For example, portions of output segments 326a and 326b between the two peaks labeled 528a are removed and the remaining portions are spliced together. Similarly, the portions of output segments 326b and 326c between the two peaks labeled 528b are removed and the remaining portions spliced together. In another embodiment, appropriate phase factors are calculated from the calibration segments by processor 460 and assigned to each of the output segments so that the segments can be coherently processed. Other coherent processing methods that use the calibration data to extract the spectral features of the spatial-spectral grating 126 are performed by processor 460 in other embodiments.

FIG. 5C is a graph 530 that illustrates a portion of a readout signal 536 constructed by splicing together output segments 326a, 326b, 326c at times indicated by peaks in calibration segments 526a, 526b, 526c, according to the illustrated embodiment. Also depicted are the associated values in the calibration segments, as spliced calibration signal 538, which effectively shows that the splicing forms single peaks 539 at 539a, 539b, 539c that correspond to double peaks 528a, 528b, 528c. As can be seen, the portion of the spliced readout signal 536 depicted in FIG. 5C corresponds to about the first 195 µs of the readout signal 140 depicted in FIG. 1D. In another embodiment, processor 460 uses the data from the calibration signal to extract the spectral features of the spatial-spectral grating 126 without explicitly producing the spliced readout signal 536.

5.0 Method of Reading Spectral Content

FIG. 6 is a flow diagram that illustrates a method for reading spectral content of a spatial-spectral grating in an IBT material, according to an illustrated embodiment. Although steps are shown in FIG. 6 in a particular order for purposes of illustration, in other embodiments the steps may be performed in a different order or overlapping in time or may be omitted or changed in any combination. For example, steps 602, 610, 620 may be performed in any order or overlapping in time.

In step 602 a condition is established whereby a spectral feature or features and/or spatial-spectral gratings are formed in an IBT material previous to readout. Any method may be used to form these spectral features and or spatial-spectral grating. In an illustrated embodiment two modulated optical signals are directed into the IBT material along the same spatial modes, k1 and k2. An optical carrier with frequency near f0 is modulated by a transmitted RF signal to form an optical signal as a first programming waveform on spatial mode k1. The optical carrier is modulated by a reduced-amplitude, reflected signal with two near-replicas of the transmitted RF signal to form another optical signal as a second programming waveform on spatial mode k2=k1. The spectral content of the resulting spatial-spectral grating is shown in FIG. 1C, and includes oscillating components with periods of about 333 MHz and 200 MHz corresponding to delays of $\tau 1 = 0.003$ µs and $\tau 2 = 0.005$ µs, respectively.

During step 602, the bandwidth of spectral features of interest in the spatial spectral grating is determined. For example, it is determined that the bandwidth with spectral features of interest spans optical frequencies from f0 −2000 MHz to f0 +2000 MHz.

In step 610, multiple chirp segments with overlapping frequency bands are formed to span the spectral features of interest. Step 610 includes determining the number and bandwidth of the chirp segments and the overlap band. For example, step 610 includes determining to use 16 chirp segments with 300 MHz bandwidth spaced apart in increments of 250 MHz, so that a chirp segment overlaps an adjacent chirp segment by 50 MHz, as listed in the first two columns of Table 2. In this embodiment, the first three narrowband chirp segments are plotted in FIG. 3A.

Step 610 also includes generating the chirp segments in a probe source, such as probe source 420 depicted in FIG. 4. For example, step 610 includes forming the 16 narrowband chirp segments listed in Table 2 by successively frequency shifting a 300 MHz optical chirp by 250 MHz.

In step 620, a hole is burned in the IBT material at a calibration frequency in each overlapping frequency band. In embodiments that do not use calibrated output segments but rely on the readout segments 326 for calibration, step 620 may be omitted. In the preferred embodiments, a hole is burned in a spatial mode $k_C$ different from the spatial modes k1, k2 of the interacting signals that formed the spatial-spectral grating. In the illustrated embodiment, spectral holes are burned in the IBT material at the frequency deviations from f0 listed in Table 2 on a spatial mode $k_C$, such as along beam 423b in FIG. 4, offset and perpendicular to spatial modes k1 and k2. In some embodiments, the spectral holes may be burned in either or both of the spatial modes of the interacting programming waveforms, e.g., k1 or k2. In other embodiments different calibration features are formed in the IBT material or in an interacting signal.

In step 630, one of the narrowband chirp segments is directed onto the IBT material. A narrowband chirp segment is directed onto the IBT material on probe spatial mode $k_P$ to produce transmitted output on spatial mode $k_T$ and delayed echo output on spatial mode $k_E$. Spatial modes $k_T$ and $k_E$ are related to programming spatial modes k1 and k2 and probe spatial mode $k_P$ according to relationships well known in the art. The phase matching conditions in non linear optics can be used to determine $k_T$ and $k_E$: $k_E=k_P+k2-k1$ and $k_T=k_P$. One possible geometry is the box geometry, which allows readout to occur simultaneously with the programming of the spectral features (see K. D. Merkel and W. R. Babbitt, "Optical coherent transient continuously programmed continuous processor," Optics Letters, 24, 172–174 (1999)). Another example is when $k_P$ is parallel to k1, $k_T$ is also parallel to k1, and $k_E$ is parallel to k2, which forms a closed box in wavenumber space.

In embodiments in which the output segments are calibrated, step 630 includes passing the chirp segment through beam splitter (such as beam splitter 424 in FIG. 4) and directing one resulting beam (beam 423a) onto probe spatial mode $k_P$ and the other (beam 423b) onto calibration spatial mode $k_C$. In the preferred embodiments, path lengths of the two beams from the beam splitter through the IBT material are selected to synchronize in time the transmission and calibrated outputs from the IBT material. In embodiments that do not use calibrated output segments, step 630 might not include directing the narrowband chirp onto a calibration spatial mode $k_C$.

In the illustrated embodiment, during one execution of step 630, chirp 306a (FIG. 3A) is split in beam splitter 424, and one beam 423a is directed into spatial mode $k_P$ while the other beam 423b is directed into spatial mode $k_C$.

In step 640, the combined reference and echo signal is detected as an output segment. In the illustrated embodiment, the transmitted signal along spatial mode $k_T$ and the delayed echo along spatial mode $k_E$ are combined by optical coupler 230 at detector 240 to form an output segment of the combined signal with the beat frequencies related to delays τ1, τ2 of near-replicas in the programming waveforms. In the illustrated example, output segment 326a is measured at detector 240. In some embodiments, step 640 includes at least one of digitizing the detected output segment in digitizer 250 and storing the detected, digitized output segment in processor 460.

In step 650, a segment of the calibration signal called a calibration segment, e.g., a segment showing one or more spectral holes, is detected. In the illustrated embodiment, calibration segment 526a of the calibration signal 442 is measured at detector 440. In embodiments that do not use calibrated output segments, step 650 may be omitted. In some embodiments, step 650 includes at least one of digitizing the detected output segment in digitizer 450 and storing the detected output segment in processor 460.

In step 658, partial results are computed. For example, a partial Fourier transform, or a partial power spectrum is computed based on the signals that have been received so far. The current readout segment is spliced to previous readout segments, and an interim Fourier transform or interim power spectrum is produced. Interim values for one or more beat frequencies $F_B$ are determined based on the partial Fourier transform or power spectrum. In some embodiments, this partial result may speed the determination of certain spectral features. In some embodiments, partial results are not computed and step 658 is omitted.

Step 660 represents a branch point in the flow. If there is another chirp segment in the probe signal, control returns to step 630 to direct the next chirp segment onto the IBT material. Steps 630, 640, 650 and 660 are repeated until all chirp segments are directed onto appropriates spatial modes of the IBT material. In the illustrated embodiment, steps 630, 640, 650, 660 are repeated 15 times until the remaining chirp segments in Table 2 are directed onto the spatial modes $k_P$ and $k_C$ of the IBT material 410 and the remaining output segments 306 or calibration segments 526 or both are detected. When there are no more chirp segments in the probe signal, control passes to step 670.

In step 670, a reconstructed readout signal, such as readout signal 140, is determined based at least in part on multiple output segments 326. In some embodiments, the readout signal is also based on multiple calibration segments 526, such as the segments that include one or more spectral holes. In some embodiments step 670 includes digitizing signals from the detectors 240 or 440 or both. In some embodiments, step 670 does not determine a reconstructed readout signal, but instead determines a mathematical representation of a reconstructed readout signal, such as its Fourier components. In some embodiments, step 670 does not determine a reconstructed readout signal, but determines the calibration parameters needed to determine a reconstructed readout signal.

In the illustrated embodiment, during step 670, the readout signal 140 is generated based on multiple output segments 306 and calibration segments 526. As described above, in the illustrated embodiment the processor splices the output segments 306 together by removing the output segment amplitudes that occur in time between calibration peaks 528 for the same calibration frequency in subsequent calibration segments 526. In some embodiments, step 670 is performed before step 660 as sections of readout signal are incrementally generated from output segments and calibration segments.

In step 680, the reconstructed readout signal is processed to determine the spectral features of the spatial spectral grating. For example, the reconstructed readout signal, such as readout signal 140, undergoes a Fourier transform to determine beat frequencies $F_B$ therein. The beat frequencies are then used with the chirp rate κ to determine the delays τ according to Equation 3a. In the illustrated embodiment, the Fourier transform of reconstructed readout signal 140 indicates two beat frequencies $F_B$ at 0.012 MHz and 0.020 MHz; and an application of Equation 3a with chirp rate κ=4 MHz/μs yields values for delays of 0.003 μs and 0.005 μs, respectively. In some embodiments, step 680 uses a mathematical representation of a reconstructed readout signal with a set of calibration parameters to determine spectral features. For example, each partial result 658 may be represented mathematically as the Fourier transform of that partial result. In this case, steps 670 and 680 then are combined, where the sum of many or all of these Fourier transforms is calculated, along with appropriate phase factors for each partial result, where these phase factors as determined by the calibration features, to directly calculate the spectral features of the partial readout signals.

In the illustrated embodiment, the chirp segments are not temporally overlapped. In some embodiments, the chirp segments can be temporally overlapped. In some embodiments, the chirp segments are separately distinguished by employing additional spatial modes in reading out the spatial-spectral grating so the chirp segments and output segments overlap in time, but not in space. In these embodiments, the calibration segments can be temporally overlapped and additional spatial modes can be used to produce and readout calibration features.

6.0 Processor Hardware Overview

Figure 7:
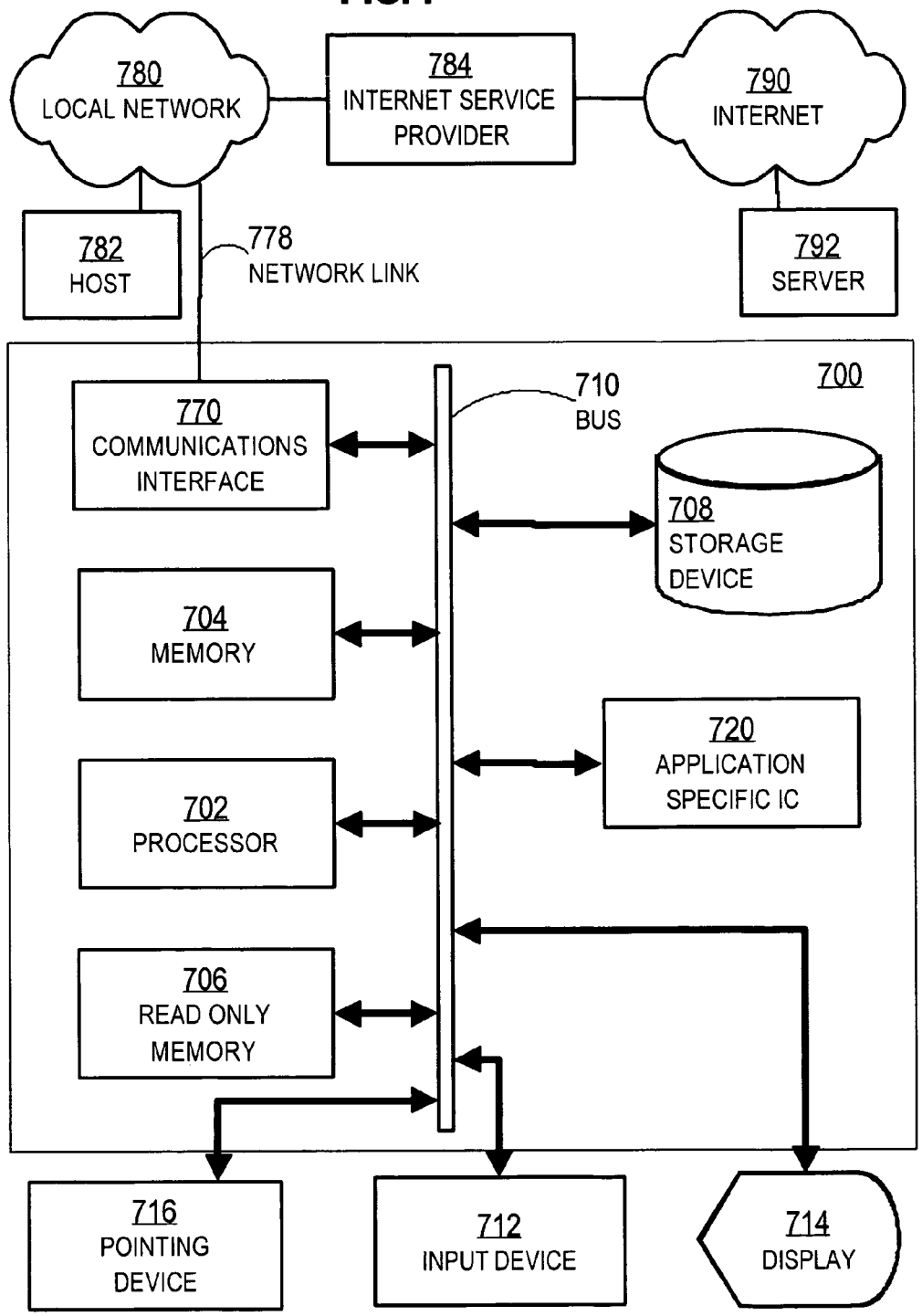
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular and atomic interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a nonvolatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends and receives electrical, acoustic or electromagnetic signals, including infrared and optical signals, that carry information streams, such as digital data. Such signals are examples of carrier waves.

The term computer-readable medium is used herein to refer to any medium that participates in providing instructions to processor 702 for execution. Such a medium may take many forms, including, but not limited to, no-volatile media, volatile media and transmission media. Nonvolatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, which carry information to and from computer system 700, are exemplary forms of carrier waves. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non volatile storage for later execution, or both. In this manner, computer system 700 may obtain application program code in the form of a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to an infra-red signal, a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of reading spectral content of a spatial-spectral grating in an inhomogeneously broadened transition (IBT) material, comprising the steps of:
   directing a plurality of probe waveforms to probe a first spatial mode of an IBT material where a spatial-spectral grating has been formed;
   detecting a plurality of output signals output from the IBT material in response to the plurality of probe waveforms; and
   based on the plurality of output signals, determining a readout signal that represents a temporal map of a spectral content of the spatial-spectral grating,
   wherein
      each probe waveform is a linear frequency modulated chirp;
      each probe waveform partially overlaps in frequency with a different probe waveform of the plurality of probe waveforms; and each probe waveform has a bandwidth less than the bandwidth of the spatial-spectral grating.

2. The method as recited in claim 1, wherein:
   the method further comprises the step of detecting a plurality of-calibration signals output from the IBT material in response to directing the plurality of probe waveforms onto the first spatial mode; and
   said step of determining the readout signal is further based on the plurality of calibration signals.

3. The method as recited in claim 1, wherein:
   the method further comprises the steps of directing the plurality of probe waveforms to probe a second spatial mode of the IBT material where a reference spectral feature is burned, and detecting a plurality of calibration signals output from the IBT material in response to directing the plurality of probe waveforms onto the second spatial mode; and said step of determining the readout signal is further based on the plurality of calibration signals.

4. The method as recited in claim 3, the method further comprising the step of burning the reference spectral feature in the second spatial mode.

5. The method as recited in claim 4, said step of burning the reference spectral feature in the second spatial mode further comprising burning a spectral feature in the second spatial mode within an overlap frequency band in which two probe waveforms of the plurality of probe waveforms overlap.

6. The method as recited in claim 4, said step of burning the reference spectral feature in the second spatial mode further comprising burning a spectral hole.

7. The method as recited in claim 4, said step of burning the reference spectral feature in the second spatial mode further comprising burning a reference spatial-spectral grating over a reference frequency band that spans a frequency band probed by a second plurality of probe waveforms of the plurality of probe waveforms.

8. The method as recited in claim 4, said step of burning the reference spectral feature in the second spatial mode further comprising:

directing a first broadband waveform onto the second spatial mode; and directing a second broadband waveform onto the second spatial mode to cause the second broadband waveform to interfere with the first broadband waveform, wherein the second broadband waveform includes a version of the first broadband waveform delayed by a delay that is known sufficiently well to calibrate the plurality of output signals.

9. The method as recited in claim 3, wherein the first spatial mode and the second spatial mode are different.

10. The method as recited in claim 3, wherein the first spatial mode and the second spatial mode are the same.

11. The method as recited in claim 1, said step of directing the plurality of probe waveforms to probe the first spatial mode further comprising directing the plurality of probe waveforms onto the first spatial mode at non-overlapping times.

12. The method as recited in claim 1, said step of directing the plurality of probe waveforms to probe the first spatial mode further comprising directing the plurality of probe waveforms onto a plurality of probe spatial modes including a first probe spatial mode different from the first spatial mode.

13. The method as recited in claim 12, said step of directing the plurality of probe waveforms to probe the first spatial mode further comprising:

directing a first probe waveform of the plurality of probe waveforms onto the first probe spatial mode for a first duration of time; and directing a second probe waveform of the plurality of probe waveforms onto a second probe spatial mode different from the first probe spatial mode for a second duration of time that overlaps the first duration.

14. The method as recited in claim 13, wherein the first spatial mode and the second probe spatial mode are different.

15. The method as recited in claim 13, wherein the first spatial mode and the second probe spatial mode are the same.

16. A computer-readable medium carrying one or more sequences of instructions for reading spectral content of a spatial-spectral grating in an inhomogeneously broadened transition (IBT) material, wherein execution of the one or more sequences of instructions by one or more processors causes the one or more processors to perform the steps of:

receiving a plurality of output signals based on output from an IBT material in response to a plurality of probe waveforms; and based on the plurality of output signals, determining a readout signal that represents a temporal map of a spectral content of the spatial-spectral grating, wherein each probe waveform is a linear frequency modulated chirp;

each probe waveform partially overlaps in frequency with a different probe waveform of the plurality of probe waveforms; and each probe waveform has a bandwidth less than the bandwidth of the spatial-spectral grating.

17. The computer readable medium as recited in claim 16, wherein each probe waveform does not overlap in time with a different probe waveform of the plurality of probe waveforms.

18. The computer readable medium as recited in claim 16, wherein:

execution of the one or more sequences of instructions further causes the one or more processors to perform the step of receiving a plurality of calibration signals based on second output from the IBT material in response to directing the plurality of probe waveforms onto a second spatial mode of the IBT material where a reference spectral feature is burned; and said step of determining the readout signal is further based on the plurality of calibration signals.

19. The computer-readable medium as recited in claim 18, wherein the first spatial mode and the second spatial mode are different.

20. The computer-readable medium as recited in claim 18, wherein the first spatial mode and the second spatial mode are the same.

21. The computer-readable medium as recited in claim 16, wherein execution of the one or more sequences of instructions further causes the one or more processors to perform the step of determining spectral features of the spatial-spectral grating in the IBT material based on the readout signal.

22. A system for reading spectral content of a spatial-spectral grating in an inhomogeneously broadened transition (IBT) material, comprising:

an IBT material in which a spatial-spectral grating has been formed;

a probe source for generating a plurality of probe waveforms wherein each probe waveform is a linear frequency modulated chirp, each probe waveform partially overlaps in frequency with a different probe waveform of the plurality of probe waveforms; and each probe waveform has a bandwidth less than the bandwidth of the spatial-spectral grating;

a first optical coupler configured for directing the plurality of probe waveforms to probe a first spatial mode of an IBT material;

a first detector for measuring a plurality of output signals output from the IBT material in response to directing the plurality of probe waveforms onto the IBT material; and a processor for determining a readout signal that represents a temporal map of a spectral content of the spatial-spectral grating based on the plurality of output signals.

23. The system as recited in claim 22, the system further comprising a second optical coupler for directing the plurality of output signals onto the first detector.

24. The system as recited in claim 23, the second optical coupler further configured for directing onto the first detector a reference signal synchronized with an output signal of the plurality of output signals to generate a low bandwidth signal at the first detector.

25. The system as recited in claim 24, wherein the reference signal is a non-delayed transmission through the IBT material.

26. The system as recited in claim 24, wherein the reference signal is a version of a probe waveform of the plurality of probe waveforms.

27. The system as recited in claim 22, wherein:
the first optical coupler further comprises a beam splitter for directing the plurality of probe waveforms onto a second spatial mode of the IBT material where a reference spectral feature is burned;
the system further comprises a second detector for measuring a plurality of calibration signals output from the IBT material in response to directing the plurality of probe waveforms onto the second spatial mode; and
the processor further determines the readout signal based on the plurality of calibration signals.

28. The system as recited in claim 27, further comprising a stable laser source for burning a spectral feature in the second spatial mode within a frequency band in which two probe waveforms of the plurality of probe waveforms overlap.

29. The system as recited in claim 27, wherein the first spatial mode and the second spatial mode are different.

30. The system as recited in claim 27, wherein the first spatial mode and the second spatial mode are the same.

31. The system as recited in claim 27, wherein the reference spectral feature in the second spatial mode is a spectral hole.

32. The system as recited in claim 27, wherein the reference spectral feature in the second spatial mode is a reference spatial-spectral grating over a reference frequency band that spans a frequency band probed by a second plurality of probe waveforms of the plurality of probe waveforms.

33. The system as recited in claim 27, further comprising a second optical coupler configured for:
directing a first broadband waveform onto the second spatial mode; and
directing a second broadband waveform onto the second spatial mode to cause the second broadband waveform to interfere with the first broadband waveform,
wherein the second broadband waveform includes a version of the first broadband waveform delayed by a delay that is known sufficiently well to calibrate the plurality of output signals.

34. The system as recited in claim 22, the first optical coupler configured for directing the plurality of probe waveforms to probe the first spatial mode further configured for directing the plurality of probe waveforms onto the first spatial mode at non-overlapping times.

35. The system as recited in claim 22, the first optical coupler configured for directing the plurality of probe waveforms to probe the first spatial mode further configured for directing the plurality of probe waveforms onto a plurality of probe spatial modes including a first probe spatial mode different from the first spatial mode.

36. The system as recited in claim 35, the first optical coupler configured for directing the plurality of probe waveforms to probe the first spatial mode further configured for:
directing a first probe waveform of the plurality of probe waveforms onto the first probe spatial mode for a first duration of time; and
directing a second probe waveform of the plurality of probe waveforms onto a second probe spatial mode different from the first probe spatial mode for a second duration of time that overlaps the first duration.

37. The system as recited in claim 36, wherein the first spatial mode and the second probe spatial mode are different.

38. The system as recited in claim 36, wherein the first spatial mode and the second probe spatial mode are the same.

* * * * *